US 7,940,307 B2

(12) United States Patent
Sasaki et al.

(10) Patent No.: US 7,940,307 B2
(45) Date of Patent: May 10, 2011

(54) METHOD OF CONTINUOUSLY CAPTURING IMAGES IN SINGLE LENS REFLEX DIGITAL CAMERA

(75) Inventors: Gen Sasaki, Osaka (JP); Kenji Nakamura, Osaka (JP)

(73) Assignee: MegaChips Corporation, Osaka-shi (JP)

( * ) Notice: Subject to any disclaimer, the term of this patent is extended or adjusted under 35 U.S.C. 154(b) by 915 days.

(21) Appl. No.: 11/831,022

(22) Filed: Jul. 31, 2007

(65) Prior Publication Data

US 2008/0043133 A1 Feb. 21, 2008

(30) Foreign Application Priority Data

Aug. 21, 2006 (JP) ................... 2006-223836

(51) Int. Cl.
*H04N 5/235* (2006.01)
*H04N 5/228* (2006.01)

(52) U.S. Cl. ............... 348/221.1; 348/223.1; 348/222.1; 348/362

(58) Field of Classification Search ............... 348/221.1, 348/222.1, 223.1, 363, 364
See application file for complete search history.

(56) References Cited

U.S. PATENT DOCUMENTS

| | | | |
|---|---|---|---|
| 7,149,925 B2 * | 12/2006 | Vath | 714/30 |
| 2002/0054220 A1 * | 5/2002 | Takeuchi | 348/223 |
| 2002/0135683 A1 * | 9/2002 | Tamama et al. | 348/222 |
| 2003/0164890 A1 * | 9/2003 | Ejima et al. | 348/333.1 |
| 2003/0175024 A1 * | 9/2003 | Miyoshi et al. | 396/154 |
| 2005/0231628 A1 * | 10/2005 | Kawaguchi et al. | 348/345 |
| 2006/0044420 A1 * | 3/2006 | Iguchi et al. | 348/231.99 |
| 2006/0256213 A1 * | 11/2006 | Sasaki | 348/231.99 |
| 2007/0216777 A1 * | 9/2007 | Quan et al. | 348/222.1 |
| 2007/0273773 A1 * | 11/2007 | Kuroiwa | 348/223.1 |
| 2008/0062272 A1 * | 3/2008 | Kuroiwa | 348/222.1 |
| 2009/0148147 A1 * | 6/2009 | Fujii et al. | 396/128 |
| 2009/0256932 A1 * | 10/2009 | Morimoto | 348/231.99 |

FOREIGN PATENT DOCUMENTS

JP 2004-304387 10/2004

* cited by examiner

*Primary Examiner* — Sinh Tran
*Assistant Examiner* — Selam Gebriel
(74) *Attorney, Agent, or Firm* — Oblon, Spivak, McClelland, Maier & Neustadt, L.L.P.

(57) ABSTRACT

The first frame of captured image data is stored as raw data in a main memory, and parameters for exposure control and white balance control are calculated from the stored image data and are set in the RPU. The second and subsequent frames of captured image data are processed in real time in the RPU without being stored in the main memory after being output from a CCD. The second and subsequent frames of captured image data are subjected to exposure control, white balance control, and JPEG compression, and then, are stored in the main memory. After operations for continuously capturing images are finished, the raw data corresponding to the first frame stored in the main memory is read by the RPU, where exposure control and white balance control are performed, and then, is stored as JPEG data in the main memory.

34 Claims, 17 Drawing Sheets

1st image post processing, 3rd image saving to card

FIG. 16

| TARGET | | | SYSTEM OF PRESENT INVENTION | | | |
|---|---|---|---|---|---|---|
| NUMBER OF PIXELS | CONTINUOUS SHOOTING RATE | MEMORY CAPACITY | | MEMORY CONFIGURATION | BANDWIDTH OF BUS | MAXIMUM BANDWIDTH |
| | | 1 FRAME OF RAW DATA FORMED OF 16-BIT PIXELS NO FRAME OF YUV DATA FORMED OF 8-BIT PIXELS 8 FRAMES OF JPEG DATA RESULTING FROM 1/4-COMPRESSION | | | JPEG PROCESSOR:W (1/4-COMPRESSED DATA) CARD CONTROLLER:R | DDR2-166 32-BIT BUS BUS EFFICIENCY OF 50% 664Mbyte/s |
| Mpix | FRAMES/s | Mbyte | | | | |
| 8 | 5 | 32 | | 256 MEGABITS*2 | 40 | ○ |
| 10 | 5 | 40 | | 256 MEGABITS*2 | 50 | ○ |
| 12 | 5 | 48 | | 256 MEGABITS*2 | 60 | ○ |
| 16 | 5 | 64 | | 512 MEGABITS*2 | 80 | ○ |
| 20 | 5 | 80 | | 512 MEGABITS*2 | 100 | ○ |
| 24 | 5 | 96 | | 512 MEGABITS*2 | 120 | ○ |

FIG. 18

| TARGET | | | CONVENTIONAL SYSTEM | | | |
|---|---|---|---|---|---|---|
| NUMBER OF PIXELS | CONTINUOUS SHOOTING RATE | MEMORY CAPACITY<br><br>2 FRAMES OF RAW DATA FORMED OF 16-BIT PIXELS<br>2 FRAMES OF YUV DATA FORMED OF 8-BIT PIXELS<br>8 FRAMES OF JPEG DATA RESULTING FROM 1/4 COMPRESSION | MEMORY CONFIGURATION | BANDWIDTH OF BUS<br><br>SPU:W<br>RPU:R/W<br>JPEG PROCESSOR:R/W<br>(1/4-COMPRESSED DATA)<br>CARD CONTROLLER:R | MAXIMUM BANDWIDTH<br><br>DDR2-166<br>32-BIT BUS<br>BUS EFFICIENCY OF 50%<br>664Mbyte/s | |
| Mpix | FRAMES/S | Mbyte | | Mbyte/s | | |
| 8 | 5 | 80 | 512 MEGABITS*2 | 360 | ○ | |
| 10 | 5 | 100 | 512 MEGABITS*2 | 450 | ○ | |
| 12 | 5 | 120 | 512 MEGABITS*2 | 540 | ○ | |
| 16 | 5 | 160 | 1 GIGABITS*2 | 720 | × | |
| 20 | 5 | 200 | 1 GIGABITS*2 | 900 | × | |
| 24 | 5 | 240 | 1 GIGABITS*2 | 1080 | × | |

PRIOR ART

METHOD OF CONTINUOUSLY CAPTURING IMAGES IN SINGLE LENS REFLEX DIGITAL CAMERA

BACKGROUND OF THE INVENTION

1. Field of the Invention

The present invention relates to a technique for continuously capturing images in a single lens reflex digital camera including a flappable mirror.

2. Description of the Background Art

In a digital camera, a function of continuously capturing images of a subject (so-called a "continuous shooting function") is performed. That is, images of a subject are continuously captured at a rate of five frames per second, for example.

Image data captured by a digital camera are subjected to various processes for image processing. The various processes for image processing include automatic exposure (which will be hereinafter abbreviated as "AE" process) in which exposure is automatically controlled, and automatic white balance control (which will be hereinafter abbreviated as "AWB" process) in which a white color is automatically adjusted to an appropriate color.

To capture a single frame of image, for example, no significant problem occurs in performing an AE process and an AWB process. Raw data of a captured image is temporarily stored in a main memory, and an evaluation value for an AE process ("AE evaluation value") or an evaluation value for an AWB process ("AWB evaluation value") are calculated. Then, exposure can be controlled by adjusting a digital gain for the image data or adjusting a gamma curve in gamma transformation. Also, white balance control can be achieved by adjusting a white balance (WB) gain for the image data.

However, to continuously capture images, there is a problem of a considerable load on a main memory or a bus band. Specifically, after all frames of image data which are continuously captured and remain in a state of raw data are temporarily stored in a main memory and an AE evaluation value and an AWB evaluation value are calculated, the image data is read out from the main memory to be subjected to image processing. Thereafter, the image data is again stored in the main memory. Further, the processed image data is read out from the main memory to be compressed into JPEG format or the like. It is difficult to follow the foregoing sequence in the course of operations for continuously capturing images.

FIG. 17 illustrates the foregoing process sequence. That is, FIG. 17 illustrates a process sequence adapted to a technique for temporarily storing captured image data which remains in a state of raw data in a main memory. More specifically, first, image data output from a sensor is stored as raw data in a main memory 120 via a sensor processing unit (SPU) 104 and main bus 125. Secondly, the raw data stored in the main memory 120 is read out by a real-time processing unit (RPU) 105 via the main bus 125, and is subjected to image processing including exposure control, white balance control, pixel interpolation, and the like. Then, the image data on which pixel interpolation has been performed is again stored in the main memory 120. Further, the image data is read out from the main memory 120 and compressed in a JPEG processor 107, to be stored as JPEG data in the main memory 120. Then, the JPEG data stored in the main memory 120 is sent to be stored in a memory card 122 via a card controller 121.

In a case where processes proceed in accordance with the foregoing process sequence illustrated in FIG. 17, data passes through the main bus 125 at extremely high frequencies, and a large buffer area on the main memory 120 is required. Even in a case where processes proceed under control by direct memory access (DMA) for the purpose of lightening a load on a CPU, the process sequence illustrated in FIG. 17 requires that DMA transfer should be provided six times in total for achieving the following processes:

(1) writing of raw data into the main memory from the SPU;
(2) reading of raw data from the main memory in the RPU;
(3) writing of YUV data to the main memory from the RPU;
(4) reading of YUV data from the main memory in the JPEG processor;
(5) writing of JPEG data to the main memory from the JPEG processor; and
(6) reading of JPEG data from the main memory in the card controller.

Consequently, a large buffer area on the main memory 120 is required, and a considerable load is applied to a bus band of the main bus 125.

FIG. 18 illustrates the capacity of a main memory and the bandwidth of a main bus which are required in the case where processes proceed in accordance with the process sequence illustrated in FIG. 17. Now, consider a situation in which an 8-mega (M) pixel sensor is employed and a continuous shooting rate is five frames per second, for example. Assuming that 2 bytes of data are necessary for each pixel, a bandwidth of 8M×2 bytes×5 frames=80 megabytes/s is required for writing of raw data. Also, the same bandwidth as noted above is necessary for each of reading of raw data in the RPU, writing of YUV data from the RPU, and reading of YUV data in the JPEG processor. Thus, a bandwidth of 80×4=320 megabytes/s is required in order to perform the above-described processes (1), (2), (3), and (4). Further, assuming that the compressibility of JPEG compression is ¼, a bandwidth of 20 megabytes/s is required in order to perform each of the above-described processes (5) and (6). As a result, a bandwidth of 360 megabytes/s is required in order to perform the above-described processes (1) through (6), as illustrated in FIG. 18.

Then, as the number of pixels included in a sensor increases to 10 M, 12M . . . , a required bandwidth increases to 450 megabytes/s, 540 megabytes/s . . . , accordingly. Assuming that the main memory is DDR-166 MHz and the bus efficiency of a 32-bit bus is 50%, the transfer rate of the bus is 644 megabytes/s. As such, when the number of pixels exceeds 16M, it is impossible to complete all processes, as is appreciated from FIG. 18. Likewise, as the number of pixels in a sensor increases, the capacity that the main memory is required to have significantly increases, as illustrated in FIG. 18.

A continuous shooting rate is a very important factor to a single lens reflex digital camera. For example, in shooting a sports scene or the like in which a subject is moving at a high speed, if a continuous shooting rate is five frames per second, the possibility of making the "best shot" is 5/3 times as large as the possibility in a case where a continuous shooting rate is three frames per second. However, to follow the above-described process sequence could not improve a continuous shooting rate because bottleneck of many data transfers with the main memory.

In view of this, the inventors of the present invention has suggested pipeline processing in which image processing is carried out in real time on image data output from a sensor without storing the image data as raw data in a main memory, and the image data is stored in the main memory only after the image data is converted to JPEG data, as taught in Japanese Patent Application Laid-Open No. 2004-304387. In the foregoing manner, that is, by processing data output from a sensor in real time without storing the data in a main memory until the data is subjected to JPEG compression with the use of the technique of pipeline processing, it is possible to lighten a load on a bus band and also reduce the required size of buffer area on a main memory.

Thus, in one possible approach, the above-described method suggested by the inventors of the present invention in Japanese Patent Application Laid-Open No. 2004-304387 is applied to continuous image capture. This approach is expected to save a bus band and considerably reduce the required size of a buffer area in a main memory.

Nonetheless, the foregoing approach causes another problem. Specifically, when data is processed in real time, it is impossible to get times for obtaining evaluation values for an AE process and an AWB process. For the second and subsequent frames of image data, an AE process or an AWB process can be performed by using evaluation values obtained from the first frame of image data in the course of continuous image capture. However, no available evaluation value for an AE process or an AWB process of the first frame of image data exists.

In this regard, in a case where a digital camera is not of a single lens reflex type, but of a compact type, an image is captured by a sensor and the captured image is displayed on a liquid crystal monitor before operations for continuously capturing images start, so that an AE evaluation value and an AWB evaluation value can be obtained before operations for continuously shooting start because.

Unlike this, in a digital camera of a single lens reflex type in which an image is stored in a sensor only after a movable mirror is flipped up, image data is captured only after operations for continuous shooting start. As such, an AE evaluation value and an AWB evaluation value for the first frame of image data cannot be obtained in advance. Accordingly, when pipeline processing is carried out as described above, an AE process and an AWB process of the first frame of image data cannot be performed.

One possible solution to overcome the foregoing problem is to calculate an AE evaluation value and an AWB evaluation value based on image data captured after a mirror is flipped up and to perform exposure control and white balance control on the first frame of image data based on the evaluation values thus obtained. However, this solution has a disadvantage that a period from a time when a shutter button is pressed to a time when image data is actually captured (so-called a "shutter time lag") becomes longer. Such a long shutter time lag is a significant drawback for a single lens reflex digital camera which is manufactured for use of high amateurs and professional photographers.

In the meantime, various types of single lens reflex digital cameras include a type that is provided with an auxiliary sensor for performing an AE process and an AWB process. Since such an auxiliary sensor is designed to capture image data even before a mirror is flipped up, an AE evaluation value and an AWB evaluation value can be obtained in advance. Nonetheless, such an auxiliary sensor has limited functions, after all, and thus, is insufficient to perform precise exposure control and white balance control. Also, there is a need of mounting an additional component onto a digital camera. On the other hand, an alternative solution in which an AE evaluation value and an AWB evaluation value for the first frame of image data are calculated by using the first half of the first frame of image data and exposure control and white balance control of the latter half of the first frame of the image data are performed by using results of the calculation based on the first half may be thought of. The alternative solution, however, still has a disadvantage that brightness or color varies at some midpoint on a screen, and thus, cannot be employed.

SUMMARY OF THE INVENTION

The present invention is intended to a method of continuously capturing images of a subject in a single lens reflex digital camera. According to the present invention, the method includes the steps of: (a) capturing leading image data including one frame of image data or plural frames of image data, and storing the leading image data in a main memory; (b) calculating an exposure adjustment value or a white balance adjustment value based on the leading image data; (c) capturing subsequent frames of image data; and (d) performing exposure control or white balance control in real time on the image data captured in the step (c) based on the exposure adjustment value or the white balance adjustment value which are calculated in the step (b), before storing the image data captured in the step (c) in the main memory, wherein the steps (c) and (d) are repeatedly performed, to achieve exposure control or white balance control in real time on the subsequent frames of image data successively, and exposure control or white balance control are performed on the leading image data stored in the main memory in the step (a) based on the exposure adjustment value or the white balance adjustment value which is calculated in the step (b), after all operations for continuously capturing images are finished.

The single lens reflex digital camera according to the present invention is able to continuously capture images with the use of a small buffer area on the memory without overloading a bus band. Also, the single lens reflex digital camera according to the present invention is able to perform appropriate exposure control and appropriate white balance control of also the first frame of image data, out of plural frames of image data which are being continuously captured, without using a sensor additional to the sensor for capturing an image.

According to preferred embodiments of the present invention, an image processor of the single lens reflex digital camera is able to carry out pipeline processing with no intermediate data being stored in the main memory until final data is generated from the captured image data input from the sensor. Also, in the step (d), the image data captured in the step (c) is processed in real time without being stored in the main memory until the image data is converted into final data.

Therefore, it is an object of the present invention to provide a technique which allows a single lens reflex digital camera to continuously capture images without applying a load on a bus band.

These and other objects, features, aspects and advantages of the present invention will become more apparent from the following detailed description of the present invention when taken in conjunction with the accompanying drawings.

BRIEF DESCRIPTION OF THE DRAWINGS

FIG. 16 illustrates a required bandwidth of a bus and a required size of a memory according to the present invention;

FIG. 18 illustrates a required bandwidth of a bus and a required size of a memory in a conventional system.

DESCRIPTION OF THE PREFERRED EMBODIMENTS

<Structure of Single Lens Reflex Digital Camera>

Figure 1:
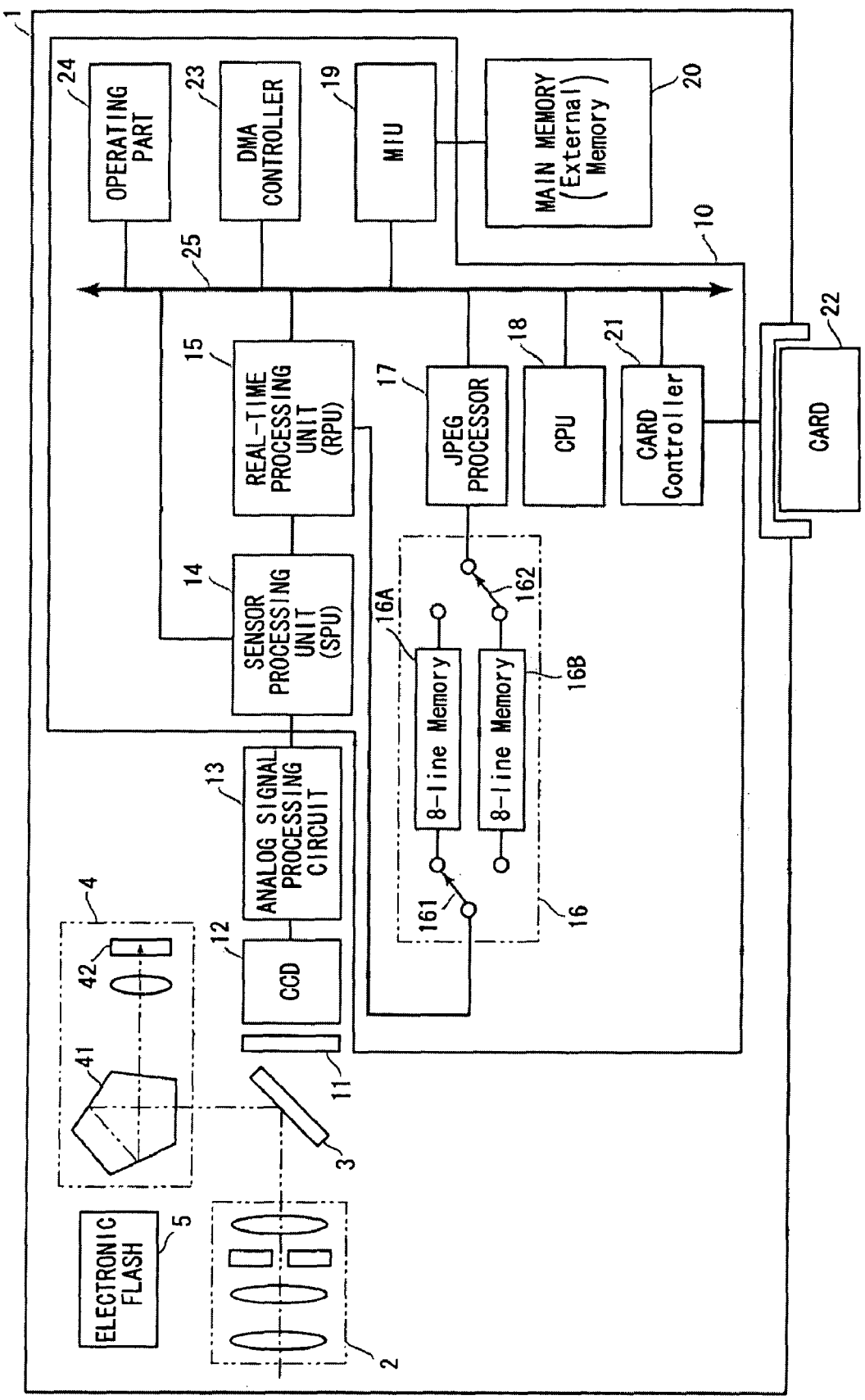
FIG. 1 is a block diagram of a single lens reflex digital camera according to preferred embodiments of the present invention.

Hereinafter, the preferred embodiments of the present invention will be discussed with reference to accompanying figures. FIG. 1 is a diagram of functional blocks of a single lens reflex digital camera 1 according to the preferred embodiments of the present invention. The single lens reflex digital camera 1 includes an optical system 2 which has an auto focus (AF) function, an auto iris function, and the like. An image of a subject which is captured through the optical system 2 is reflected by a movable mirror (reflex mirror) 3 and is sent to a finder 4.

The finder 4 includes a pentagonal prism 41 and a viewfinder 42. Light reflected by the movable mirror 3 is reflected by the pentagonal prism 41, and is sent as an erect image, to the viewfinder 42. A user is able to optically acknowledge an image of a subject within a range of an image which is to be captured ("image capture range") by looking into the viewfinder 42.

The movable mirror 3 is configured to be turned by a mirror drive mechanism which is not illustrated. When operations for capturing images start in response to a user's press of a shutter button, the movable mirror 3 is flipped up, so that light which is incident through the optical system 2 is received by a CCD 12 via a shutter 11. At that time, light in an adjusted amount may be emitted from an electronic flash 5 in synchronization with the time of image capture, to be applied to the subject, as needed.

The CCD 12 is an image sensor which photoelectrically converts incident light and outputs stored electric charges as an electrical signal. In the preferred embodiments of the present invention, a CCD of a progressive (sequential scanning) type is employed as the CCD 12. While there is a CCD of an interlaced type in which fields of even-numbered lines and fields of odd-numbered lines are output at different times, a CCD of a progressive type is employed in the preferred embodiments of the present invention, in order to allow image processing to be carried out in real time as later described in detail. Additionally, though a CCD is employed as an image sensor in the preferred embodiments of the present invention, also a CMOS sensor can alternatively be employed.

Figure 2:
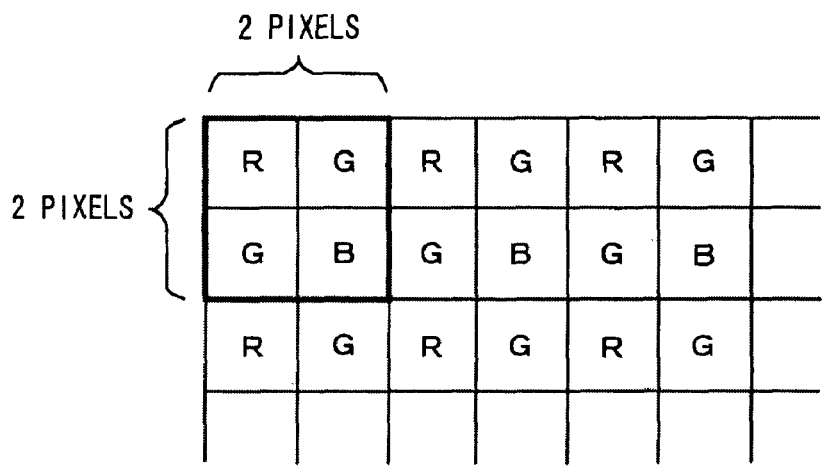
FIG. 2 illustrates a color filter array in RGB Bayer pattern.

Also, the CCD 12 is provided with a color filter array in RGB Bayer pattern as illustrated in FIG. 2. Accordingly, each of pixel signals output from the CCD 12 is a pixel signal having any of color components R, G, and B. Because of color arrangement in RGB Bayer pattern as illustrated in FIG. 2, in one of series of signals which are output from the CCD 12, R signals and G signals are alternately output as "R→G→R→G→", while in another series of signals, G signals and B signals are alternately output as "G→B→G→B→".

An analog pixel signal output from the CCD 12 is input to an analog signal processing circuit 13, where analog signal processing is carried out, and thereafter the signal is subjected to A/D conversion.

A digital image signal resulting from the A/D conversion is input to a sensor processing unit (which will be hereinafter abbreviated as "SPU") 14. The SPU 14 performs various processes including defective pixel correction and black level difference calculation, on input image data. Also, the SPU 14 includes a processor for obtaining an evaluation value used for exposure control ("exposure control evaluation value") from an input digital image signal, and a processor for obtaining an evaluation value used for white balance control ("white balance control evaluation value") from an input digital image signal.

A digital image signal output from the SPU 14 is raw data on which pixel interpolation has never been performed. Since the CCD 12 is provided with the color filter array in RGB Bayer pattern as described above, a digital image signal output from the SPU 14 is a signal including pixels each of which has only one of color components R, G, and B. The SPU 14, as well as a main memory 20, is connected to a main bus 25, and is able to store raw data in the main memory 20 as it is.

Further, the SPU 14 is connected to a real-time processing unit (which will be hereinafter abbreviated as "RPU") 15, and is able to output raw data to the RPU 15 without outputting the raw data to the main bus 25. The RPU 15 is a processor for carrying out general image processing including pixel interpolation.

Figure 3:
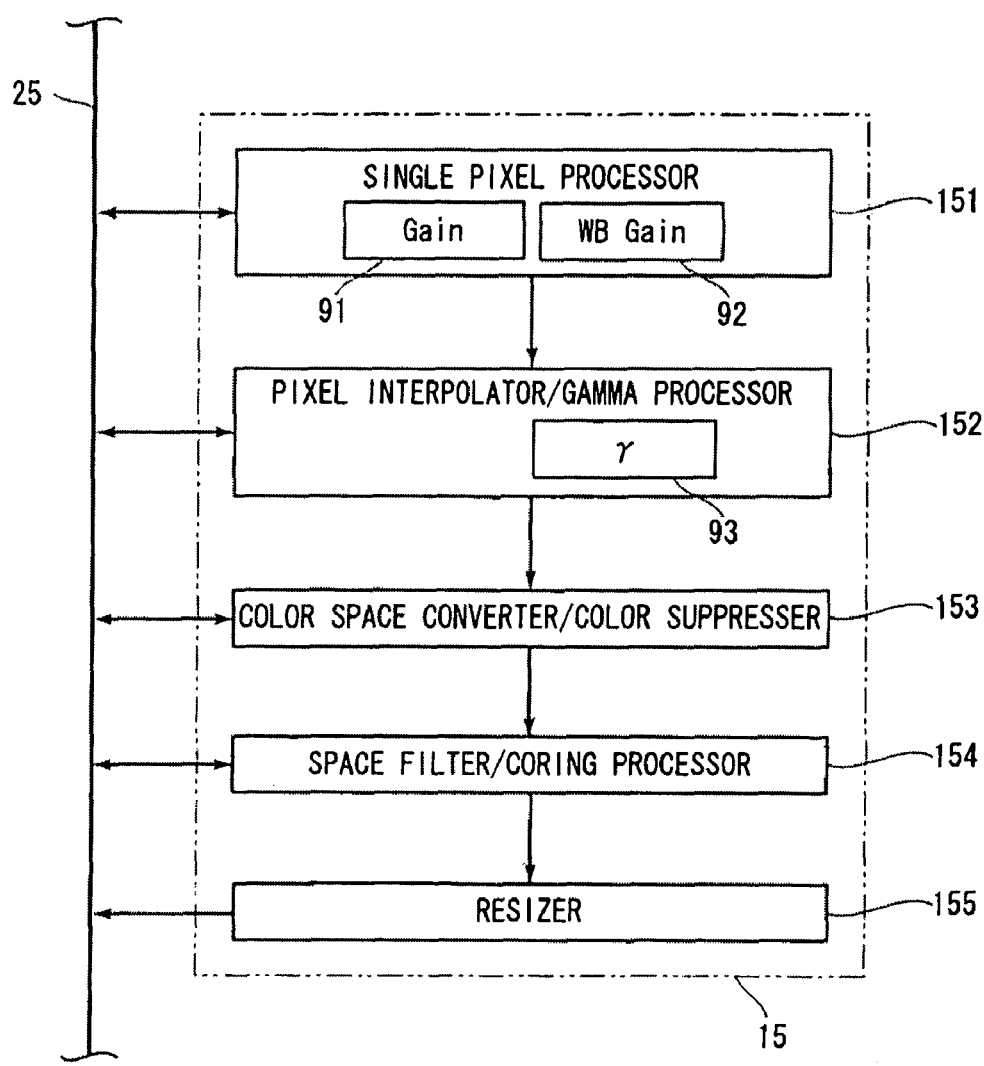
FIG. 3 illustrates processing blocks of a real-time processing unit.

FIG. 3 is a diagram of processing blocks of the RPU 15. The RPU 15 includes a single pixel processor 151, a pixel interpolator/gamma processor 152, a color space converter/color suppresser 153, a space filter/coring processor 154, and a resizer 155.

The single pixel processor 151 performs time-series averaging for averaging each of pixel values in input image data over plural frames, for example, shading correction for correcting variation in brightness in an image, and the like.

Also, the single pixel processor 151 performs exposure control on a captured image by controlling a gain for a digital image based on a digital gain value 91. More specifically, a CPU 18 calculates the digital gain value 91 based on an exposure control evaluation value obtained in the SPU 14 as described above. Then, exposure of a captured image is controlled based on the digital gain value 91 which is stored in a register included in the single pixel processor 151 by the CPU 18. In a single lens reflex system, an amount of light stored in the sensor is controlled by the optical system 2 and the shutter 11, so that AE control is achieved to a certain degree. However, more precise AE control can be achieved by controlling the digital gain value 91 of the single pixel processor 151 also after A/D conversion, which is one of the features of a digital camera.

Further, the single pixel processor 151 includes a processor for controlling white balance of each of pixels in a digital image based on a value for necessary calculation in white balance control ("white balance control calculation value") 92. More specifically, the CPU 18 calculates the white balance control calculation value 92 based on a white balance control evaluation value obtained in the SPU 14 as described above. Then, white balance is controlled based on the white balance control calculation value 92 which is stored in the register included in the single pixel processor 151 by the CPU 18. The white balance control calculation value 92 includes a gain for R pixels (R-gain), a gain for G pixels (G-gain), and a gain for B pixels (B-gain) which are respectively applied to image data for R, image data for G, and image data for B, which are provided as raw data. Alternatively, a ratio between R pixels and B pixels may be varied while fixing the gain for G pixels.

The pixel interpolator/gamma processor 152 includes a pixel interpolator for interpolating a missing color component of each of pixels by referring to peripheral pixels in input image data, and a gamma corrector for correcting gamma characteristic of an image. As a result of pixel interpolation in the pixel interpolator, input image data is converted to image data in which each of pixels has all of color components R, G, and B.

In gamma correction, a pixel value of input pixel is converted according to a gamma transformation characteristic value 93 stored in a register. Specifically, the CPU 18 calculates the gamma transformation characteristic value 93 based on an exposure control evaluation value obtained in the SPU 14 as described above. Then, exposure of a captured image is controlled based on the gamma transformation characteristic value 93 stored in a register included in the pixel interpolator/gamma processor 152 by the CPU 18.

The color space converter/color suppresser 153 includes a color space converter for converting a color space of input image data, from RGB color space to YCbCr color space, for example, and a color suppresser for suppressing coloring in a bright portion and a dark portion in an image where white balance is apt to upset. In the preferred embodiments of the present invention, the color space converter serves to convert image data in RGB color space to YUV image data.

The space filter/coring processor 154 includes a space filter for emphasizing a line and an edge in input image data and removing noises in input image data, and a nonlinear processor for primarily suppressing a high-pass component in an image signal.

The resizer 155 changes a resolution of input image data in accordance with a size of a stored image which is set by a user.

The RPU 15 includes the plural processing blocks 151, 152, 153, 154, and 155 as described above. Then, in the RPU 15, the processing blocks 151, 152, 153, 154, and 155 sequentially process image data input from the SPU 14, to thereby process image data output from the CCD 12 in real time without storing the image data as raw data in the main memory 20. For the purpose of processing image data input from the SPU 14 in real time without storing the image data in the main memory 20, the RPU 15 includes plural line memories. The RPU 15 is able to carry out image processing in the above-described processing blocks with plural lines of image data input to the plural line memories being held. Since the CCD 12 of the single lens reflex digital camera 1 is of a progressive type as described above, real-time image processing is possible with image data output from the CCD 12 being held in the plural line memories.

Also, each of the processing blocks 151, 152, 153, 154, and 155 included in the RPU 15 is connected to the main bus 25. Accordingly, the RPU 15 is able to sequentially process image data input from the SPU 14 in real time as described above. Moreover, each of the processing blocks 151, 152, 153, 154, and 155 included in the RPU 15 is able to independently read out image data stored in the main memory 20 and carry out image processing on the read image data because of connection between each of the processing blocks, 151, 152, 153, 154, and 155 and the main bus 25.

Because of the foregoing configuration, a process included in image processing, which process cannot be performed by the RPU 15, can be appropriately processed in the CPU 18 by using a software. Then, resultant data is transferred to an appropriate one out of the processing blocks in the RPU 15, where general image processing is carried out subsequently to the process in the CPU 18. As a result, a processing speed can increase to several times or several tens of times a processing speed in a case where all processes in image processing are performed by a software operation in the CPU 18. Further, a processing load on the CPU 18 is reduced, to thereby reduce power consumption.

Referring again to FIG. 1, the RPU 15 is connected with two strips of buffers 16. Image data which is converted from RGB color space to YUV color space in the RPU 15 is output to the buffers 16. The buffers 16 includes two selectors 161 and 162 and two buffers 16A and 16B which are connected in parallel to each other between the two selectors 161 and 162. Each of the buffers 16A and 16B is provided with eight line memories. The selectors 161 and 162 are configured such that when one of them is connected to the buffer 16A, the other is connected to the buffer 16B.

For example, when the selector 161 is connected to the buffer 16A, eight lines of YUV image data which are output from the RPU 15 are stored in the buffer 16A. At the same time, eight lines of YUV image data which are stored in the buffer 16B are output to a JPEG processor 17 placed in the subsequent stage. Conversely, when eight lines of YUV image data which are output from the RPU 15 are stored in the buffer 16B, eight lines of YUV image data which are stored in the buffer 16A are output to the JPEG compressor 17.

As described above, the JPEG processor 17 is able to successively receive eight lines of YUV image data, and to perform JPEG compression on each of 8×8 macro blocks of the received image data. As a result, the single lens reflex digital camera 1 can carry out image processing in real time on image data output from the CCD 12 in the RPU 15 without storing the image data in the main memory 20, and further, can complete JPEG compression on YUV image data on which pixel interpolation has been performed without storing the YUV image data in the main memory 20. After JPEG compression is performed in the JPEG processor 17, JPEG data is stored in the main memory 20.

JPEG data stored in the main memory 20 is sent to be stored in a memory card 22 such as a flash memory via a card controller 21. In this manner, image processing is completed, and compressed image data is stored in the memory card 22.

The single lens reflex digital camera 1 according to the preferred embodiment of the present invention is configured as described above. Specifically, the SPU 14, the RPU 15, the JPEG processor 17, and the CPU 18 are connected to the main bus 25. Also, the main memory 20 is connected to the main bus 25 via a memory interface unit (MIU) 19. Further, the card controller 21 is connected to the main bus 25, and has access to the memory card 22. Moreover, an operating part 24 is connected to the main bus 25, so that the CPU 18 is notified of operating instructions given by a user. The operating part 24 includes all operating elements which are necessary for giving operating instructions to the single lens reflex digital camera 1, such as a dial for selecting a shooting mode, and a shutter button (release button).

Furthermore, the main bus 25 is connected with a DMA controller 23. The DMA controller 23 includes DMA channels assigned to data transfers between the processing blocks and an arbitration circuit for controlling a transfer sequence for each of the DMA channels. Thus, the SPU 14, the RPU 15, the JPEG processor 17, and the card controller 21, and the like which are connected to the main bus 25 can write data into the main memory 20 and read out data from the main memory 20 under control of the DMA controller 23 without applying a processing load on the CPU 18.

Then, the main bus 25, the SPU 14, the RPU 15, the JPEG processor 17, the CPU 18, the MIU 19, the card controller 21, the DMA controller 23, and the operating part 24 which are connected to the main bus 25, and the buffers 16 interposed between the RPU 15 and the JPEG processor 17 are integrated into an LSI chip 10, as illustrated in FIG. 1

Below, the preferred embodiments each of which deals with continuous image capture (which will be also referred to as "continuous shooting" as appropriate) in the single lens reflex digital camera 1 which is configured as described above will be discussed.

First Preferred Embodiment

Figure 4:
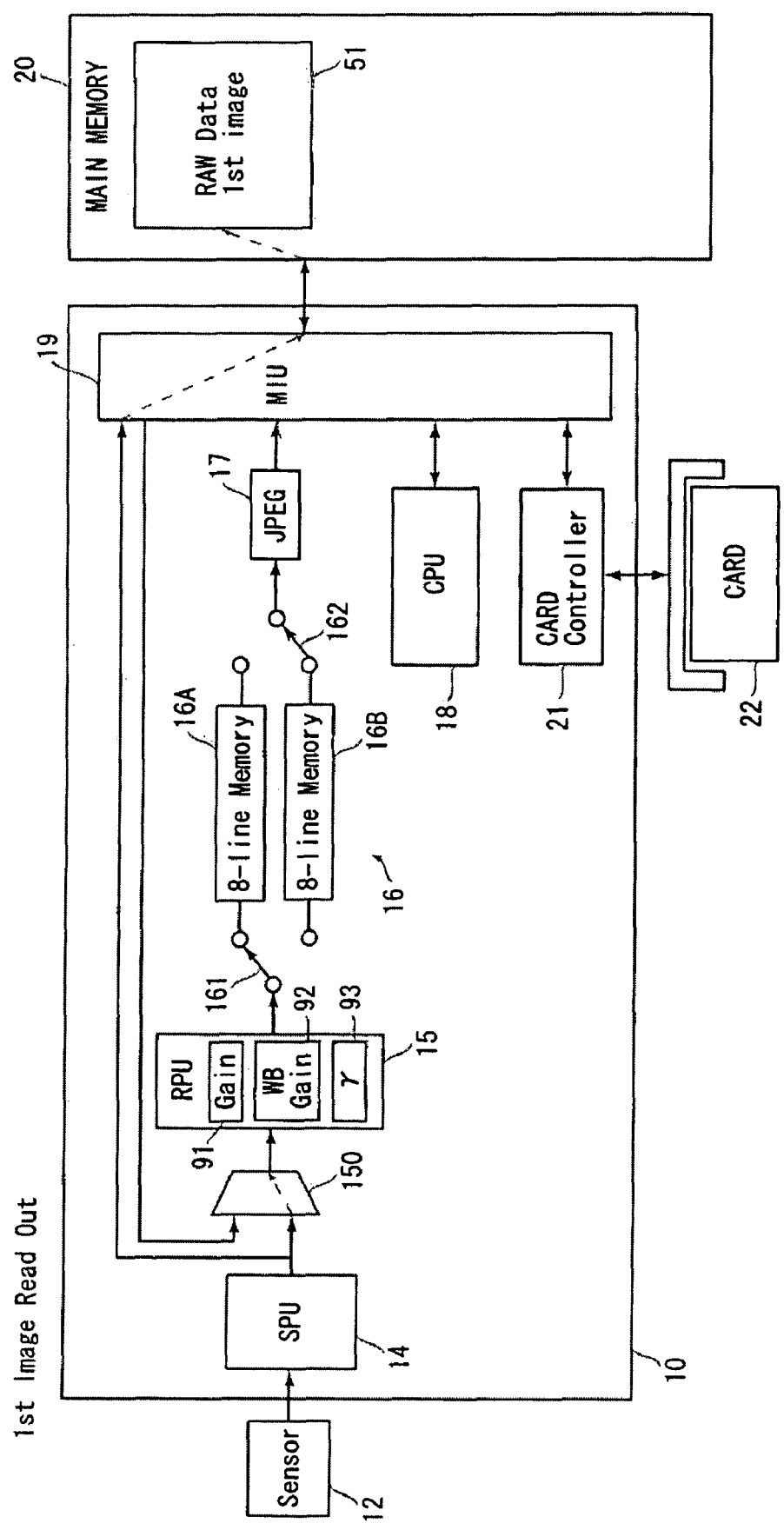
FIG. 4 illustrates one step in operations for continuously capturing images.

Now, a method of continuously capturing images according to the first preferred embodiment will be discussed. FIG. 4 illustrates processing blocks related to operations for continuously capturing images in the single lens reflex digital camera 1. As illustrated in FIG. 4, the SPU 14, the RPU 15, the JPEG compressor 17, the CPU 18, and the like are integrated into the LSI chip 10.

First, the operating part 24 is actuated by a user, so that the single lens reflex digital camera 1 is set to a continuous shooting mode. After the single lens reflex digital camera 1 is set to a continuous shooting mode, images of a subject are continuously captured at a rate of five to ten frames per second, for example, for a period of time during which a user is pressing the shutter button.

With the single lens reflex digital camera 1 being set to a continuous shooting mode, in response to a user's press of the shutter button, the movable mirror 3 is flipped up and the shutter 11 is opened for a predetermined period of time, so that images of a subject are incident upon the CCD 12. An image signal output from the CCD 12 is subjected to A/D conversion and is processed in the SPU 14, and thereafter, the image signal is stored as raw data 51 in the main memory 20 as illustrated in FIG. 4. That is, the first frame of image out of plural frames of images which are continuously captured is processed in the SPU 14, first, and then, the first frame of image remaining in a state of raw data is stored in the main memory 20 without passing through the RPU 15 (in other words, without being subjected to general image processing including pixel interpolation).

While the first frame of captured image data remaining in a state of raw data is being stored in the main memory 20, the CPU 18 calculates the digital gain value 91 for exposure control, the gamma transformation characteristic value 93, and the white balance control calculation value 92 (those three values are adjustment values and will be collectively referred to as "parameters" in the following discussion as appropriate) by using the first frame of captured image data.

Additionally, an exposure control evaluation value and a white balance control evaluation value which are used for calculating the digital gain value 91 for exposure control, the gamma transformation characteristic value 93, and the white balance control calculation value 92 are obtained in the SPU 14 before the raw data 51 is stored in the main memory 20, as described above. Alternatively, an exposure control evaluation value and a white balance control evaluation value may be obtained based on the raw data 51 being read out by the CPU 18 after the raw data 51 is stored in the main memory 20. In a case where an exposure control evaluation value and a white balance control evaluation value are obtained in the SPU 14, a processing load on the CPU 18 can be lightened. On the other hand, in a case where an exposure control evaluation value and a white balance control evaluation value are obtained by a software operation in the CPU 18, more precise (or, more appropriate) evaluation values can be obtained. As an exposure control evaluation value, a value obtained by multiplying G signals, which are generally recognized as being the closest to a luminance signal out of signals provided by the color filters in RGB Bayer pattern, in each of plural blocks on a screen, or the like is employed. As a white balance control evaluation value, a value obtained by multiplying each of color signals provided by a color filter array in RGB Bayer pattern in each of plural blocks on a screen, or the like is employed.

Figure 5:
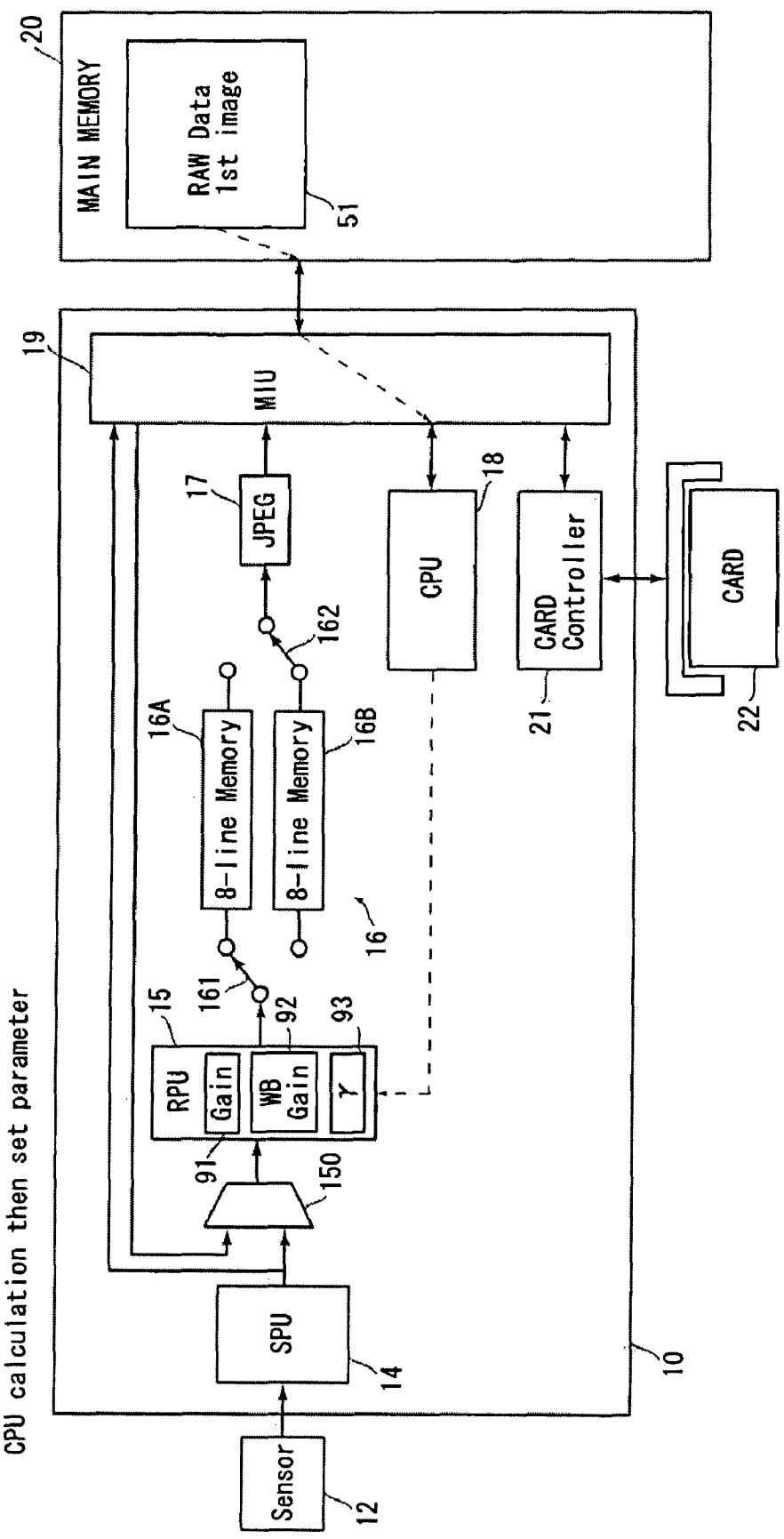
FIG. 5 illustrates one step in the operations for continuously capturing images.

The CPU 18 calculates the digital gain value 91 for exposure control, the gamma transformation characteristic value 93, and the white balance control calculation value 92 by using an exposure control evaluation value and a white balance control evaluation value which are obtained as described above, and sets the calculated parameters in the register included in the RPU 15 as illustrated in FIG. 5. Then, exposure control and white balance control can be performed in real time on subsequent frames of image data which are to be continuously captured.

Now, differences between evaluation values (exposure control evaluation value and white balance control evaluation value) and the adjustment values (parameters) 91, 92, and 93 which have been referred to above will be clarified. Each of an exposure control evaluation value and a white balance control evaluation value is a value obtained by multiplying pixel values of each of the colors provided by a color filter array in RGB Bayer pattern within a given block, and is data on which calculations for AE and AWB are based. Those evaluation values are obtained by multiplying raw data in the memory with the use of the CPU as described above. Alternatively, those evaluation values can be obtained by multiplication with the use of a hardware in the SPU 14 or the single pixel processor 151 of the RPU 15 during real-time processing. On the other hand, the adjustment values such as the digital gain value 91, the gamma transformation characteristic value 93, and the white balance control calculation value 92 are AE gain and AWB gain which are obtained by calculations for AE and AWB with the use of the foregoing evaluation values.

After the processes illustrated in FIGS. 4 and 5 are performed on the first frame of image data, the movable mirror 3 is temporarily flipped down. At that moment, a user is able to optically acknowledge a subject through the viewfinder 42. As such, in a typical single lens reflex system, each time a frame of image of a subject is captured, the captured image of the subject is sent to the viewfinder 42 even for a moment with the mirror being flipped down even during continuous image capture, to thereby allow a user to continuously shoot the subject while following the subject.

Subsequently, the movable mirror 3 is flipped up and the shutter 11 is opened for a predetermined period of time, so that the second frame of image of the subject is incident upon the CCD 12. The second frame of captured image data is processed in the SPU 14, and thereafter, is transferred to the RPU 15 without being stored in the main memory 20. Then, in the RPU 15, exposure control is performed on the second frame of captured image data by using the digital gain value 91 for exposure control and the gamma transformation characteristic value 93 which are calculated from the first frame of image data in the above-described manner, and further, white balance control is performed on the second frame of captured image data by using the white balance control calculation value 92 which is calculated from the first frame of image data. YUV image data resulting from pixel interpolation in the RPU 15 is transferred to the JPEG processor 17 via the buffers 16 without being stored in the main memory 20, and is subjected to JPEG compression. Then, the second frame of captured image data which is compressed is stored as JPEG data 52 in the main memory 20. The state where the JPEG data 52 is stored in the main memory 20 is illustrated in FIG. 6.

As described above, during continuous image capture, exposure control and white balance control of the second frame of image data are performed in real time by using the digital gain value 91 for exposure control, the gamma transformation characteristic value 93, and the white balance control calculation value 92 which are obtained after the first frame of image data is captured. Meanwhile, the technique of perfect pipeline processing can be applied to the SPU 14, the RPU 15, the JPEG processor 17, and other processing blocks which are connected thereto because of inclusion of the plural line memories in the RPU 15 and interposition of the two strips of buffers 16 between the RPU 15 and the JPEG processor 17. That is, a series of processes including exposure control, white balance control, pixel interpolation, and JPEG compression are performed on image data output from the CCD 12 with the use of the technique of pipeline processing, to thereby eliminate a need of storing intermediate data in the main memory 20. Only after JPEG data which is finally-generated data is generated, the data is stored in the main memory 20.

Figure 6:
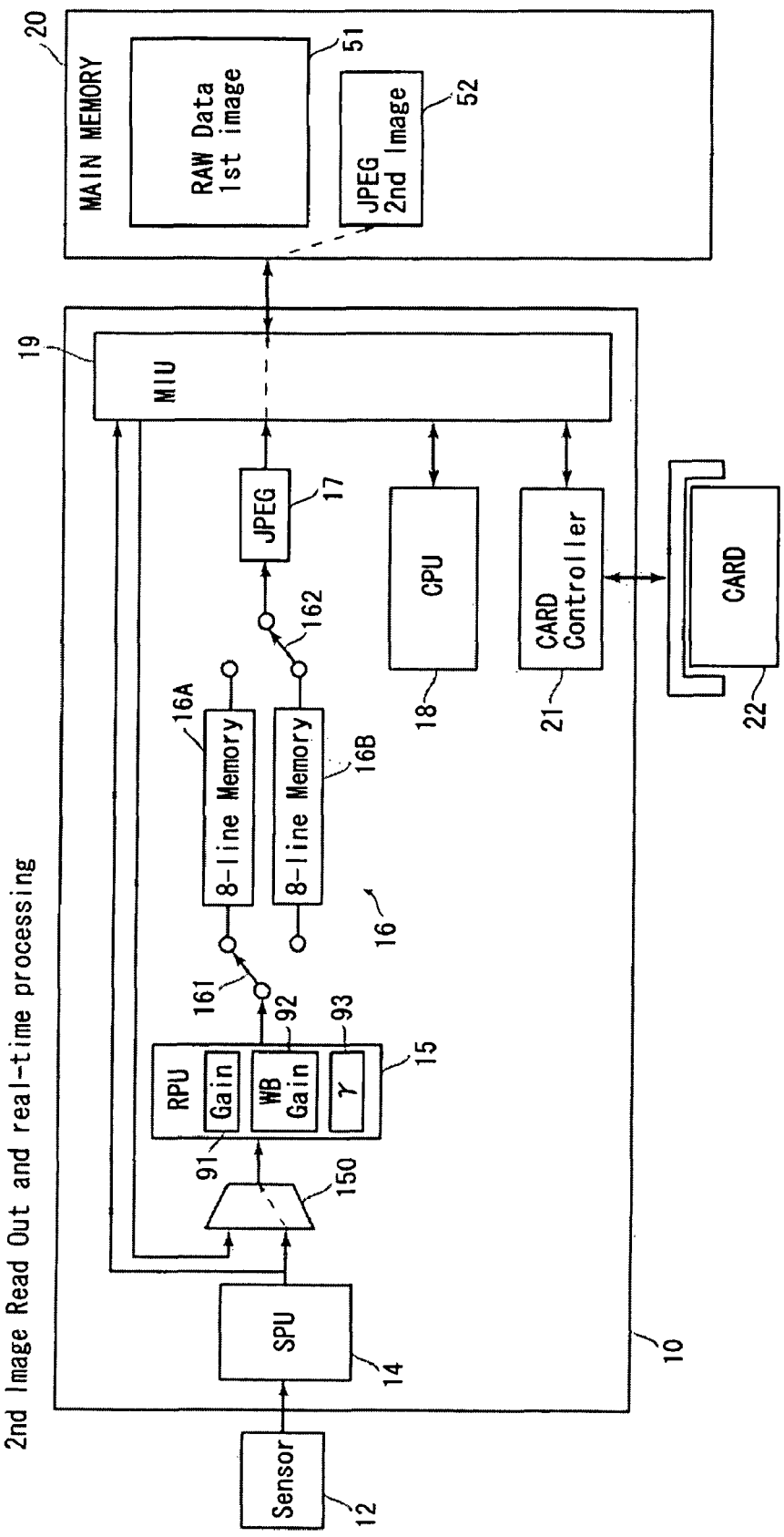
FIG. 6 illustrates one step in the operations for continuously capturing images.

After the processes illustrated in FIG. 6 are performed on the second frame of captured image data, the movable mirror 3 is temporarily flipped down, so that a user is able to optically acknowledge a subject through the viewfinder 42 again. Subsequently, the movable mirror 3 is flipped up and the shutter 11 is opened for a predetermined period of time, so that the third frame of image of a subject is incident upon the CCD 12. The third frame of image data, like the second frame, is processed in the SPU 14, and thereafter, is transferred to the RPU 15 without being stored in the main memory 20. Then, in the RPU 15, exposure control is performed on the third frame of captured image data by using the digital gain value 91 for exposure control and the gamma transformation characteristic value 93 which are calculated from the first frame of image data, and further, white balance control is performed on the third frame of captured image data by using the white balance control calculation value 92 which is calculated from the first frame of image data. YUV image data resulting from pixel interpolation in the RPU 15 is transferred to the JPEG processor 17 via the buffers 16 without being stored in the main memory 20, and is subjected to JPEG compression. Then, the third frame of captured image data which is compressed is stored as JPEG data 53 in the main memory 20. The state where the JPEG data 53 is stored in the main memory 20 is illustrated in FIG. 7.

Figure 7:
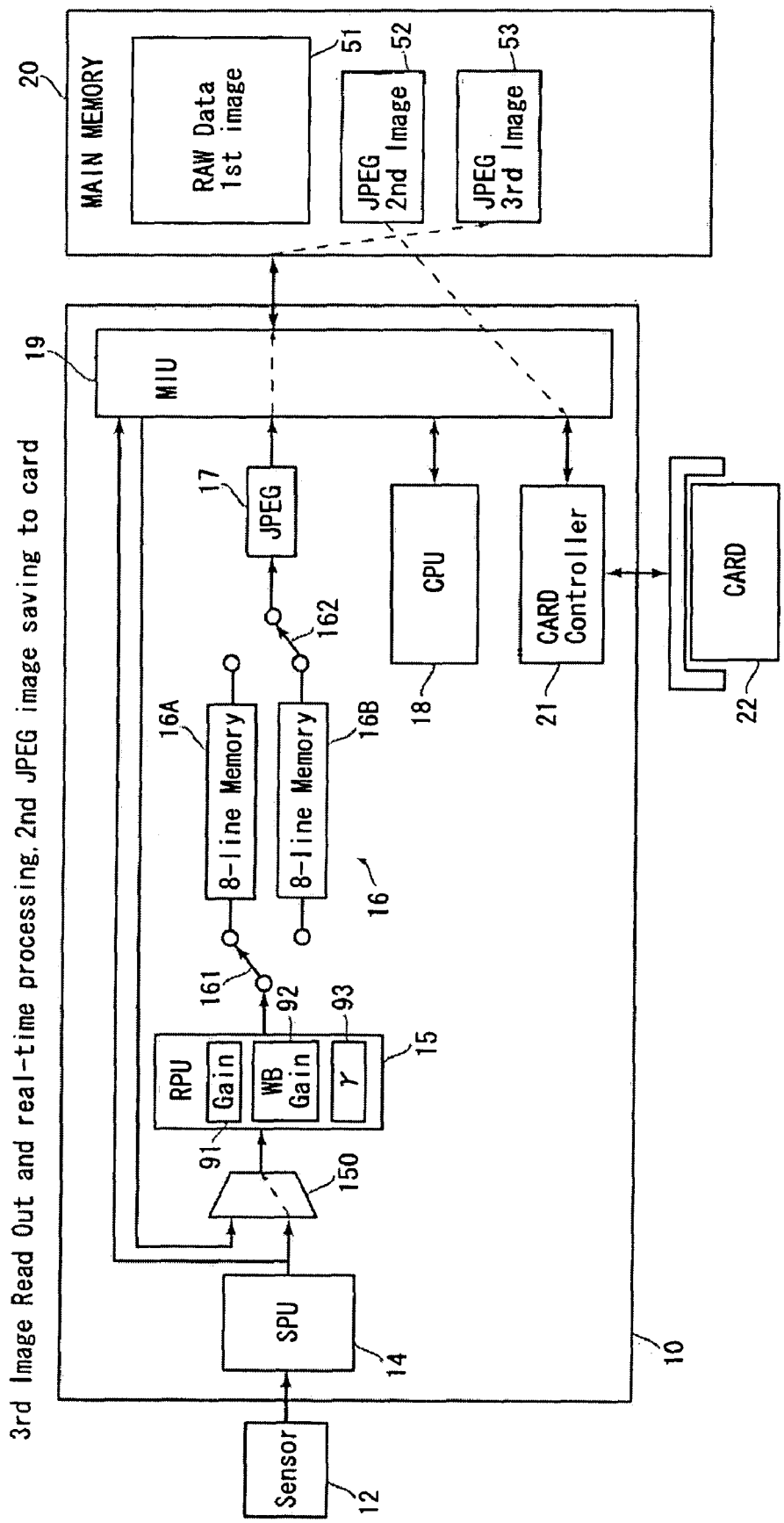
FIG. 7 illustrates one step in the operations for continuously capturing images.

Also, at the same time as the third frame of captured image data is stored as the JPEG data 53 in the main memory 20 as illustrated in FIG. 7, the JPEG data 52 corresponding to the second frame of captured image data is sent to be stored in the memory card 22 via the card controller 21.

As described above, subsequent to the processes on the second frame of captured image data, exposure control, white balance control and other processes are performed in real time on the third frame of image data by using the digital gain value 91 for exposure control, the gamma transformation characteristic value 93, and the white balance control calculation value 92 which are obtained when the first frame of image data is captured.

Figure 8:
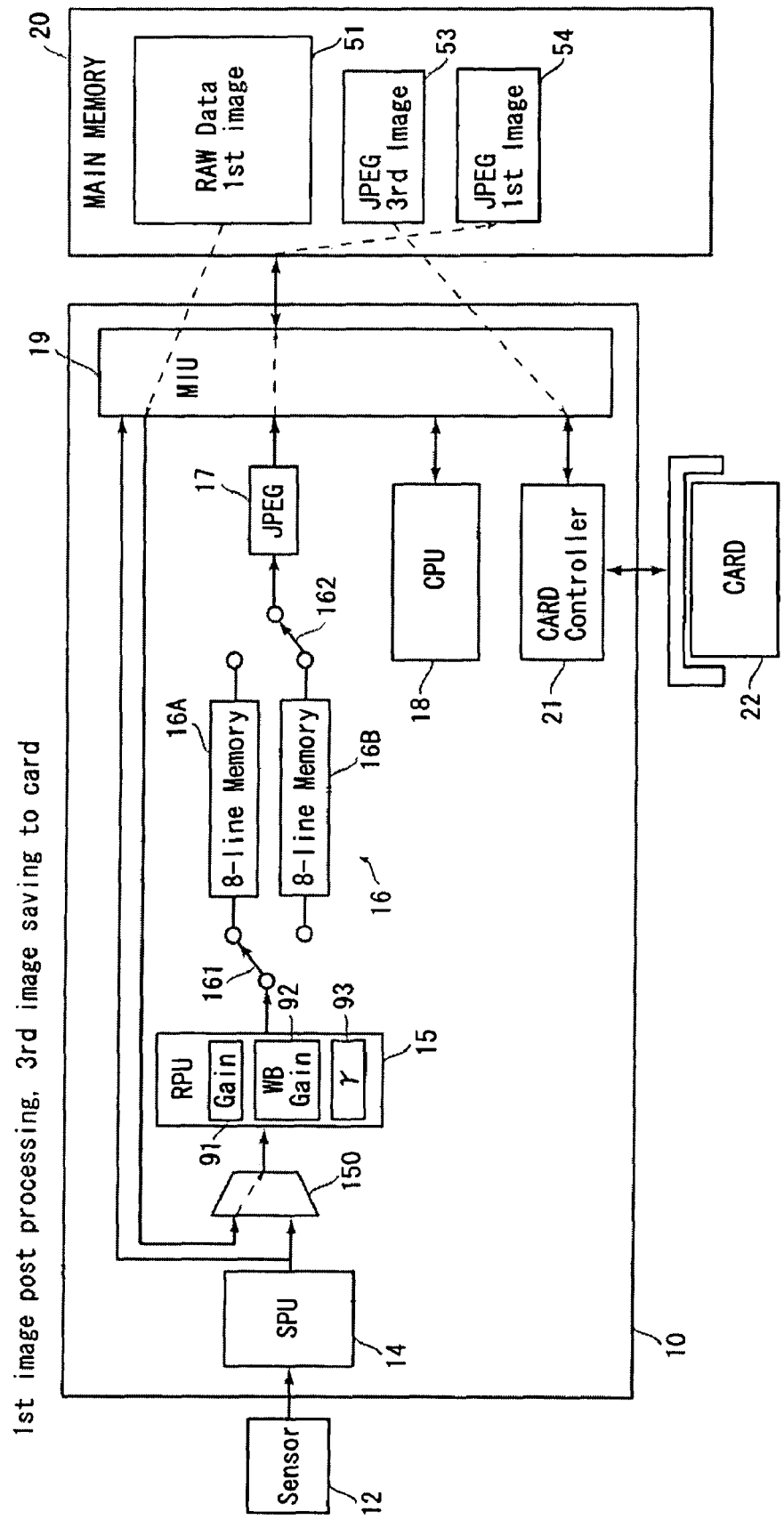
FIG. 8 illustrates one step in the operations for continuously capturing images.

Now, consider a situation in which a user moves his fingers off the shutter button, to stop giving instructions for continuously capturing images when the third frame of image data is captured. When the operations for continuously capturing images are finished, the raw data 51 corresponding to the first frame of captured image data which is stored in the main memory 20 is transferred to the RPU 15 as illustrated in FIG. 8. While the processes illustrated in FIGS. 4, 5, 6, and 7 are being performed, a selector 150 placed upstream of the RPU 15 is controlled to output an input provided from the SPU 14 to the RPU 15. On the other hand, while the processes illustrated in FIG. 8 are being performed, the selector 150 is controlled to output an input provided from the main bus 25 to the RPU 15.

Then, in the RPU 15, the raw data 51 corresponding to the first frame of captured image data is subjected to exposure control by using the digital gain value 91 for exposure control and the gamma transformation characteristic value 93, and also subjected to white balance control by using the white balance control calculation value 92, in the same manner as the second and third frames of captured image data. YUV image data resulting from pixel interpolation in the RPU 15 is transferred to the JPEG processor 17 via the buffers 16 without being stored in the main memory 20, and is subjected to JPEG compression. Thus, the first frame of captured image data which is compressed is stored as JPEG data 54 in the main memory 20.

As described above, the first frame of captured image data is temporarily stored in the main memory 20 while remaining in a state of raw data at the time of being captured, and after all frames of images are continuously captured, the first frame of captured image data is read by the RPU 15 to be subjected to general image processing. For the image processing of the first frame of captured image data, exposure control and white balance control are performed by using the digital gain value 91 for exposure control, the gamma transformation characteristic value 93, and the white balance control calculation value 92 which are calculated from the first frame of captured image data.

Also, at the same time as the first frame of captured image data is stored as the JPEG data 54 in the main memory 20, the JPEG data 53 corresponding to the third frame of captured image data is sent to be stored in the memory card 22 as illustrated in FIG. 8.

Figure 9:
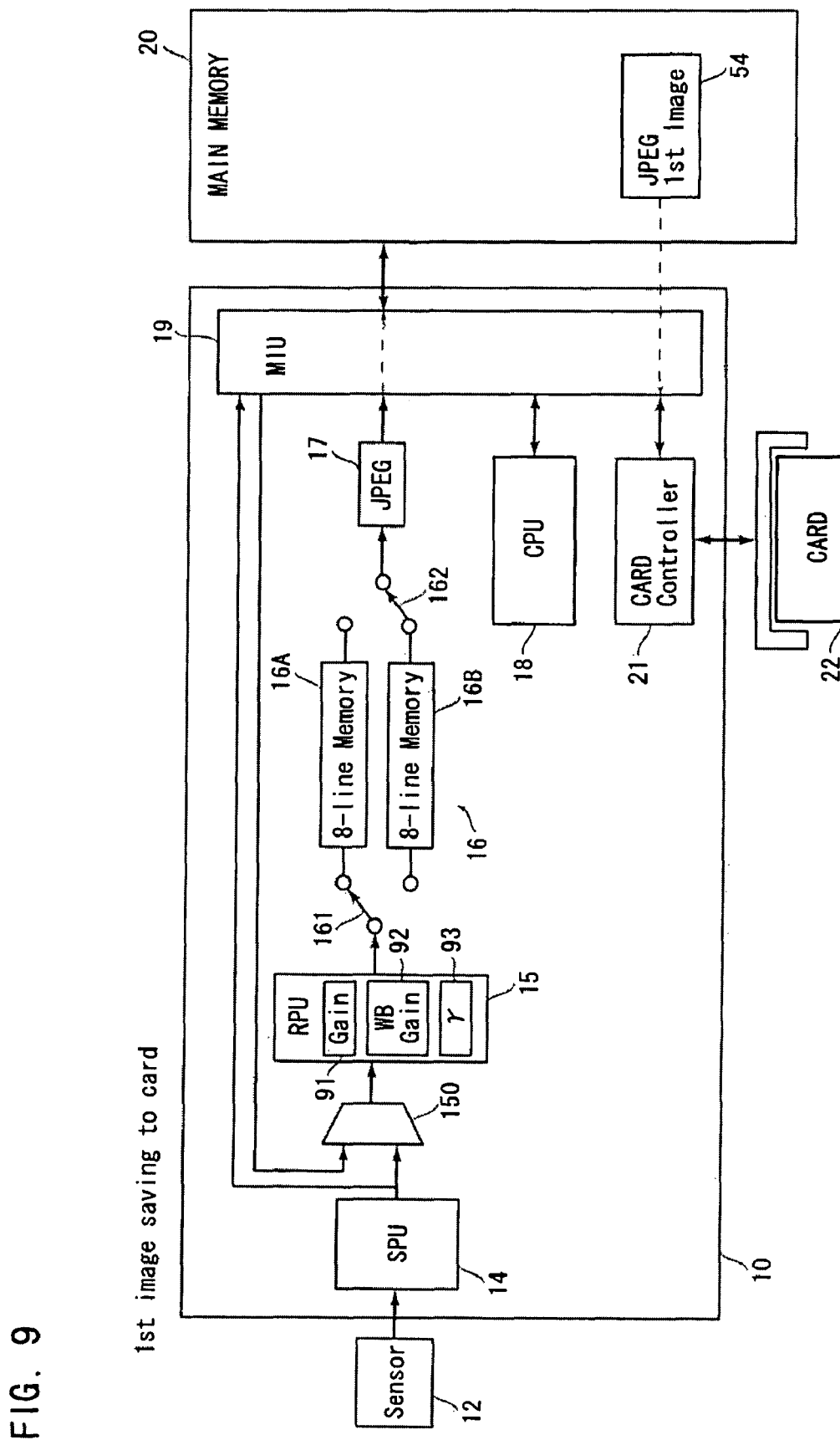
FIG. 9 illustrates one step in the operations for continuously capturing images.

Lastly, the JPEG data 54 corresponding to the first frame of captured image data which is stored in the main memory 20 is sent to be stored in the memory card 22, as illustrated in FIG. 9.

Figure 10:
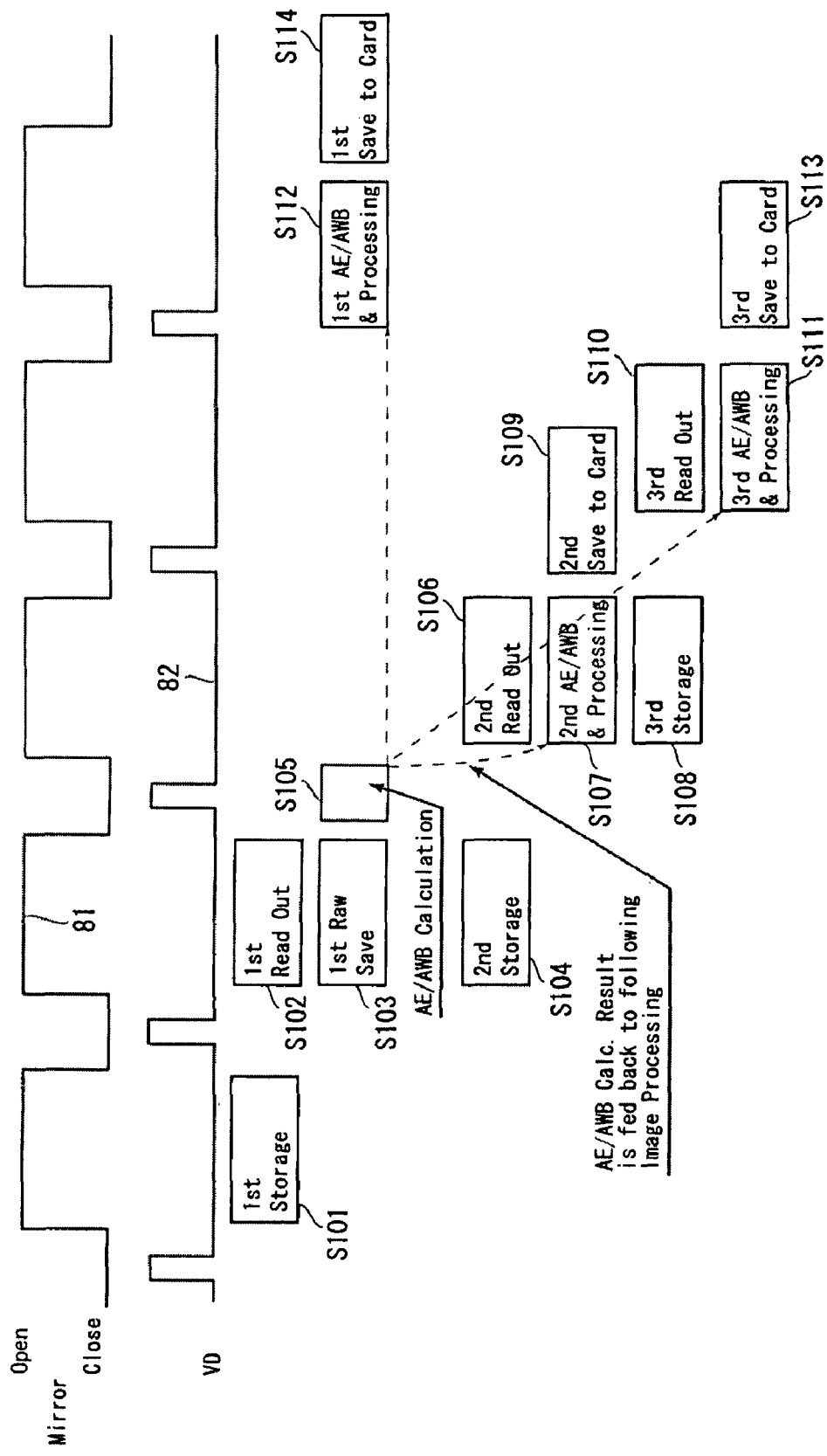
FIG. 10 illustrates a process sequence of operations for continuously capturing images according to the first preferred embodiment.

FIG. 10 illustrates a process sequence of the above-described operations for continuously capturing images. In FIG. 10, a signal 81 serves to control the movable mirror 3 to open or close. The term "open" for the movable mirror 3 indicates a state in which the movable mirror 3 is flipped up so that an image of a subject is incident upon the CCD 12. A signal 82 is a vertical synchronization signal of the CCD 12.

First, with the first timing, the first frame of image of a subject is stored in the CCD 12 (step S101). With the second timing, the first frame of captured image data is read out from the CCD 12 (step S102), and is stored as raw data in the main memory 20 (step S103). Also, the second frame of image of the subject is stored in the CCD 12 (step S104) with the second timing. The foregoing processes correspond to the processes illustrated in FIG. 4.

Subsequently, the CPU 18 calculates the digital gain value 91 for exposure control, the gamma transformation characteristic value 93, and the white balance control calculation value 92 (step S105). Then, the CPU 19 sets the calculated parameters in the register in the RPU 15. The foregoing processes correspond to the processes illustrated in FIG. 5. Additionally, an exposure control evaluation value and a white balance control evaluation value which are used for calculating the digital gain value 91 for exposure control, the gamma transformation characteristic value 93, and the white balance control calculation value 92 in the CPU 18 can be obtained either in the SPU 14 or by a software operation in the CPU 18.

With the third timing, the second frame of captured image data is read out from the CCD 12 (step S106), and exposure control, white balance control, and other general image processing including pixel interpolation are performed in real time on the second frame of captured image in the RPU 15. At the same time, JPEG compression is performed via the two strips of YUV buffers (step S107). In a strict sense, white balance control is delayed with respect to exposure control, other general image processing including pixel interpolation is delayed with respect to white balance control, and JPEG compression is delayed with respect to other general image processing including pixel interpolation, each by a time for passing through the pipelines and the two strips of YUV buffers. However, each of such delays is so slight when compared to a total time for completing image processing of one frame, that those processes can be regarded as being synchronous with each other. Then, the second frame of captured image is stored as JPEG data in the main memory 20. Also, at the same time, the third frame of image of the subject is stored in the CCD 12 (step S108). The foregoing processes correspond to the processes illustrated in FIG. 6.

With the fourth timing, JPEG data corresponding to the second frame of captured image data is stored in the memory card 22 (step S109). Also, with the fourth timing, the third frame of captured image data is read out from the CCD 12 (step S110), and exposure control, white balance control, and other processes are performed in real time on the third frame of captured image data in the RPU 15 (step S111). Then, the third frame of captured image data is stored as JPEG data in the main memory 20. The foregoing processes correspond to the processes illustrated in FIG. 7.

With the fifth timing, the raw data corresponding to the first frame of captured image data is read by the RPU 15, and is subjected to exposure control and white balance control (step S112). Then, the first frame of captured image data is stored as JPEG data in the main memory 20. Also, with the fifth timing, the JPEG data corresponding to the third frame of captured image data is sent to be stored in the memory card 22 (step S113). The foregoing processes correspond to the processes illustrated in FIG. 8.

Lastly, the JPEG data corresponding to the first frame of captured image data which is stored in the main memory 20 is sent to be stored in the memory card 22 (step S114). The foregoing processes correspond to the processes illustrated in FIG. 9.

As is made clear from the above discussion, in the single lens reflex digital camera 1 according to the first preferred embodiment, the first frame of captured image data remaining in a state of raw data is temporarily stored in the main memory 20, and the digital gain value 91 for exposure control, the gamma transformation characteristic value 93, and the white balance control calculation value 92 are calculated based on the first frame of captured image data. Then, with those parameters being set in the register in the RPU 15, image processing can be carried out in real time on each of the second and subsequent frames of captured image data by using the technique of pipeline processing without storing intermediate data in the main memory 20 over a period of time from output of the CCD 12 to generation of JPEG data. As a result, it is possible to significantly reduce a buffer area required in the main memory 20, and also to significantly lighten a load on a bus band of the main bus 25. Further, it is possible to significantly reduce power consumption during continuous image capture, as a consequence.

Moreover, exposure control and white balance control of the raw data which corresponds to the first frame of captured image data and is stored in the main memory 20 are finally achieved based on the initially-obtained parameters. Therefore, it is possible to perform appropriate exposure control and white balance control on all frames of captured image data without the need of an auxiliary sensor or the like, while allowing images to be continuously captured by using the technique of pipeline processing.

Figure 15:
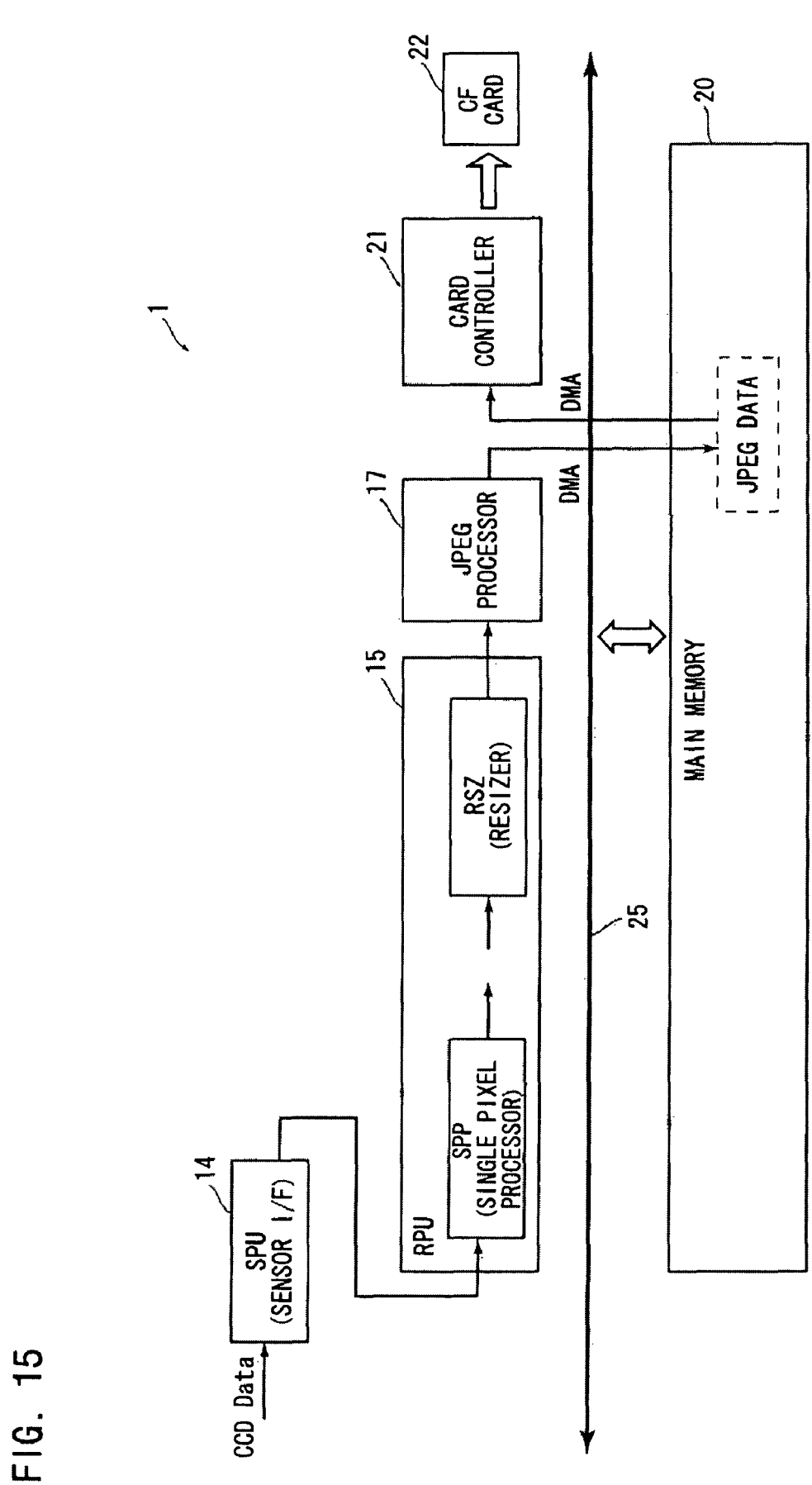
FIG. 15 illustrates the frequency of accesses to a main memory according to the present invention.
Figure 17:
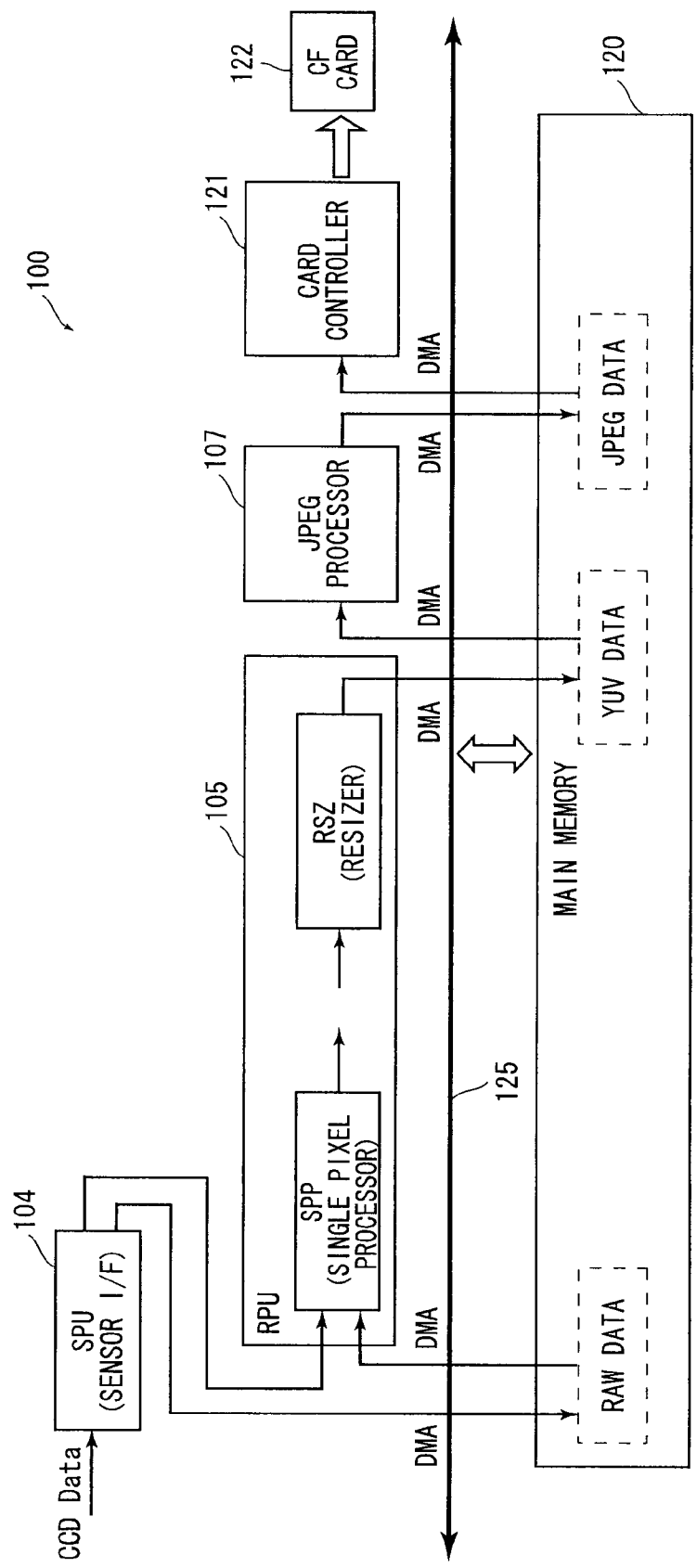
FIG. 17 illustrates a frequency of accesses to a main memory in a conventional system.

FIG. 15 illustrates a buffer area required in the main memory 20 and a load applied on the main bus 25. From comparison of FIG. 15 and FIG. 17 which illustrates the conventional method, it is appreciated that the number of DMA transfers decreases to two from six. Thus, a load on a bus band can be significantly lightened. Also, since the main memory 20 stores only JPEG data (except raw data corresponding to the first frame of captured image data), a buffer area required in the main memory 20 can be significantly reduced.

FIG. 16 is a table showing a required bandwidth of the bus and a required size of the main memory in the configuration of the system illustrated in FIG. 15. FIG. 16 is comparable with FIG. 18 regarding the conventional system. Consider a situation in which an 8-mega pixel sensor is employed and a continuous shooting rate is five frames per second, for example. Assuming that 2 bytes of data are necessary per pixel, the required bandwidth of the bus is no more than 40 megabytes/s in the system according to the foregoing example. Thus, in the system according to the present invention, only the processes (5) and (6) out of the processes (1) through (6) described in paragraphs entitled "Description of Background Art" require access to the main memory. Each of the processes (5) and (6) requires a bandwidth of 20 megabytes/s, so that the required bandwidth as a whole is 40 megabytes/s. As such, the system according to the present invention allows for significant saving of the bus band. Further, though the required bandwidth increases along with an increase in the number of pixels included in the sensor (which increases to 10 mega, 12 mega, . . . ), the required bandwidth is no more than 120 megabytes/s even if the number of pixels is 24 mega, for example. Accordingly, assuming that the main memory 20 is DDR2-166 MHz and the bus efficiency of a 32-bit bus is 50%, the transfer rate of the bus is 644 megabytes/s. Thus, an adequate margin can be left in the bus band. For actual application, by employing a memory which is operable at lower frequencies, it is also possible to significantly reduce power consumption.

Second Preferred Embodiment

Next, the second preferred embodiment of the present invention will be discussed. A process flow according to the second preferred embodiment is substantially identical to that according to the first preferred embodiment. A difference lies in that while only the first frame of captured image data remaining in a state of raw data is stored in the main memory 20 and the second and subsequent frames of captured image data are processed in real time according to the first preferred embodiment, plural frames of captured image data including the first frame of captured image data are collectively dealt with as leading image data and the leading image data remaining in a state of raw data is stored in the main memory 20 according to the second preferred embodiment.

Figure 11:
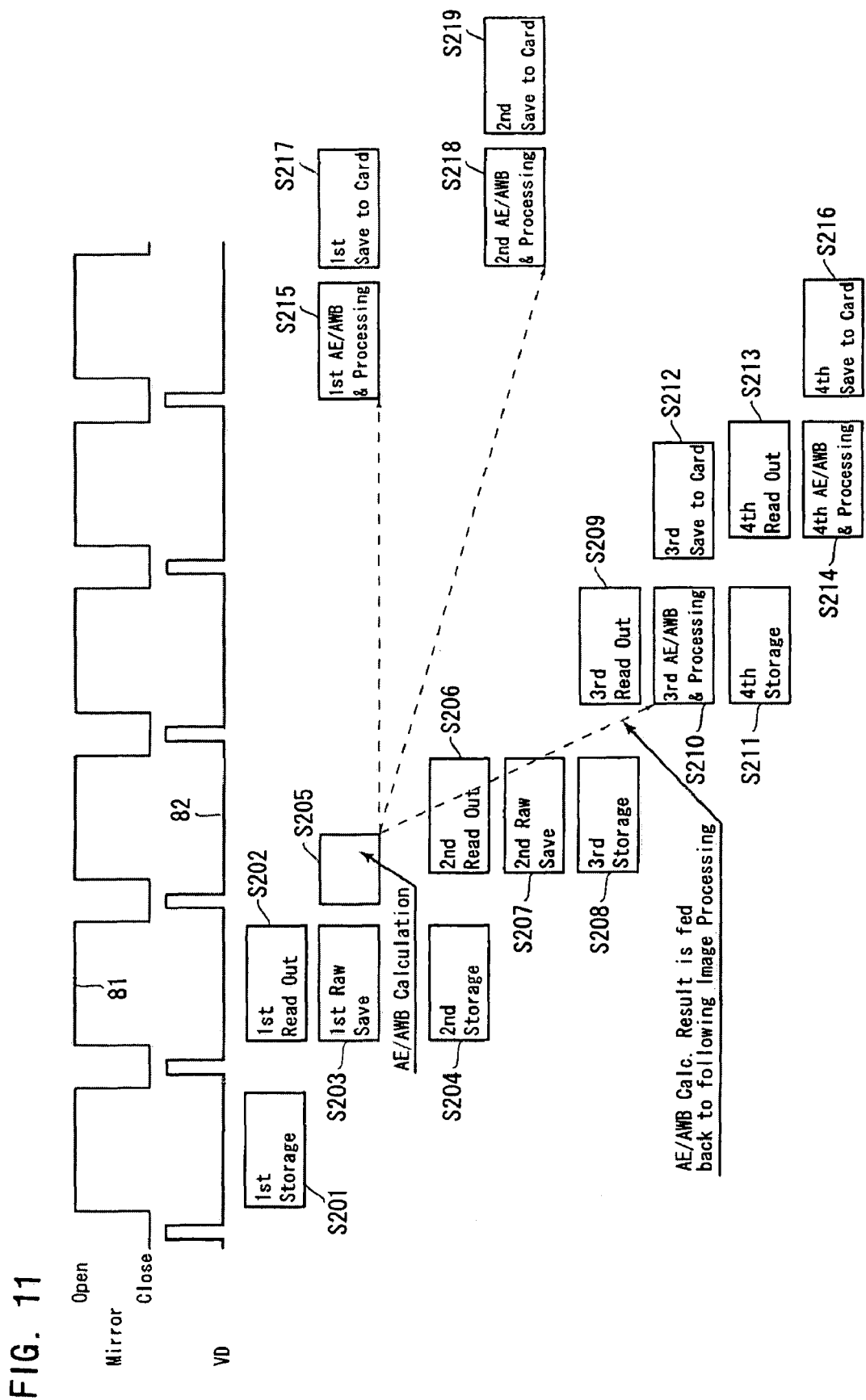
FIG. 11 illustrates a process sequence of operations for continuously capturing images according to the second preferred embodiment.

FIG. 11 illustrates processes for storing the first and second frames of captured image data as raw data in the main memory 20, as one example.

First, with the first timing, the first frame of image of a subject is stored in the CCD 12 (step S201). With the second timing, the first frame of captured image data is read out from the CCD 12 (step S202) and is stored as raw data in the main memory 20 (step S203). Also, the second frame of image of the subject is stored in the CCD 12 (step S 204) with the second timing.

Subsequently, with the third timing, the CPU 18 calculates the digital gain value 91 for exposure control, the gamma transformation characteristic value 93, and the white balance control calculation value 92 (step S205). Then, the CPU 18 sets the calculated parameters in the register in the RPU 15.

Further, with the third timing, the second frame of captured image data is read out from the CCD 12 (step S206), and is stored as raw data in the main memory 20 (step S207). Furthermore, with the third timing, the third frame of image of the subject is stored in the CCD 12 (step S208).

With the fourth timing, the third frame of captured image data is read out from the CCD 12 (step S 209), and exposure control, white balance control, and other processes are performed in real time on the third frame of captured image data in the RPU 15 (step S210). Then, the third frame of captured image data is stored as JPEG data in the main memory 20. Also, the fourth frame of image of the subject is stored in the CCD 12 (step S211) with the fourth timing.

With the fifth timing, the JPEG data corresponding to the third frame of captured image data is stored in the memory card 22 (step S212). Also, the fourth frame of captured image data is read out from the CCD 12 (step S213), and exposure control, white balance control, and other processes are performed in real time on the fourth frame of captured image data in the RPU 15 (step S214) with the fifth timing. Then, the fourth frame of captured image data is stored as JPEG data in the main memory 20.

With the sixth timing, the raw data corresponding to the first frame of captured image data is read by the RPU 15, and is subjected to exposure control and white balance control (step S 215). Then, the first frame of captured image data is stored as JPEG data in the main memory 20. Also, the JPEG data corresponding to the fourth frame of captured image data is stored in the memory card 22 (step S 216) with the sixth timing.

With the seventh timing, the JPEG data corresponding to the first frame of captured image data which is stored in the main memory 20 is sent to be stored in the memory card 22 (step S217). Also, the raw data corresponding to the second frame of captured image data is read by the RPU 15, and is subjected to exposure control and white balance control (step S218) with the seventh timing. Then, the second frame of captured image data is stored as JPEG data in the main memory 20. Lastly, the JPEG data corresponding to the second frame of captured image data is stored in the memory card 22 (step S219).

As is made clear from the above discussion, according to the second preferred embodiment, the leading image data formed of plural frames including the first frame (the first and second frames in the example discussed above) are temporarily stored as raw data. Subsequently, the digital gain value 91 for exposure control, the gamma transformation characteristic value 93, and the white balance control calculation value 92 are calculated based on the first frame of captured image data in the same manner as in the first preferred embodiment. Then, with the calculated parameters being set in the RPU 15, it is possible to generate JPEG data corresponding to each of the third and subsequent frames of captured image data without storing intermediate data in the main memory 20 by using the technique of pipeline processing.

By storing not only the first frame of captured image, but also plural frames of captured images which are directly subsequent to the first frame, as raw data, it is possible to cope with a case in which a relatively long time is required for calculating the digital gain value 91 for exposure control, the gamma transformation characteristic value 93, and the white balance control calculation value 92. For example, in order to perform exposure control and white balance control to an extremely precise degree, a relatively long time should be taken to calculate the parameters by a software operation in the CPU 18. For this reason, in some cases, the parameters cannot be calculated in time for processing some frames of captured images which are directly subsequent to the first frame, such as the second frame of capture image. In view of this, leading image data formed of plural frames of image data including the first frame of image data is temporarily stored as raw data. Then, after the parameters are calculated and set in the register in the RPU 15, real-time processing can be carried out.

Third Preferred Embodiment

Next, the third preferred embodiment will be discussed. According to the first preferred embodiment, the first frame of captured image data is stored as raw data in the main memory 20, and the digital gain value 91 for exposure control, the gamma transformation characteristic value 93, and the white balance control calculation value 92 are calculated based on the first frame of captured image data. Then, exposure control and white balance control are performed in real time on all subsequent frames of captured images by using the parameters calculated from the first frame of captured image.

Figure 12:
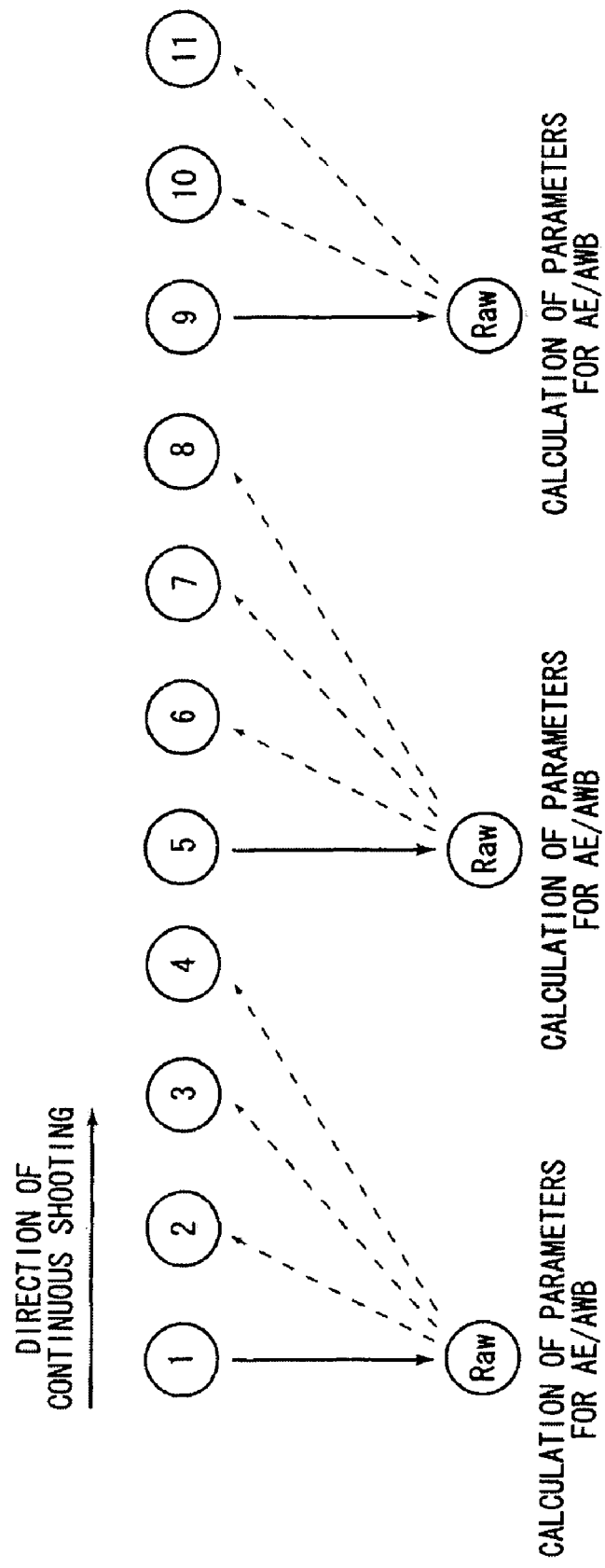
FIG. 12 conceptually illustrates operations for continuously capturing images according to the third preferred embodiment.

According to the third preferred embodiment, the digital gain value 91 for exposure control, the gamma transformation characteristic value 93, and the white balance control calculation value 92 are periodically updated. FIG. 12 illustrates a method of continuously capturing images according to the third preferred embodiment. In an example illustrated in FIG. 12, each time four frames of image data are captured, raw data is stored in the main memory 20 and the digital gain value 91 for exposure control, the gamma transformation characteristic value 93, and the white balance control calculation value 92 are newly calculated.

More specifically, the digital gain value 91 for exposure control, the gamma transformation characteristic value 93, and the white balance control calculation value 92 are calculated from the first frame of captured image data, and the first frame of captured image data is stored as raw data. Exposure control and white balance control of the second, third, and fourth frames of captured image data are achieved based on the parameters calculated form the first frame of captured image data. Subsequently, the digital gain value 91 for exposure control, the gamma transformation characteristic value 93, and the white balance control calculation value 92 are calculated from the fifth frame of captured image data, and the fifth frame of captured image data is stored as raw data. Exposure control and white balance control of the sixth, seventh, and eighth frames of captured image data are achieved based on the parameters calculated from the fifth frame of captured image data. In a manner analogous to the foregoing manner, the tenth, eleventh, and twelfth frames of captured image data are processed by using the parameters calculated from the ninth frame of captured image data.

Then, when all operations for continuously capturing images are finished, exposure control and white balance control are performed on the first, fifth, and ninth frames of captured image data which are stored as raw data. In this regard, exposure control and white balance control of the first frame of captured image data can be achieved by using the parameters calculated from the first frame of captured image data, and likewise, each of the fifth and ninth frames of captured image data can be processed by using the parameters calculated therefrom.

According to the third preferred embodiment, the parameters used for exposure control and white balance control are periodically updated. Therefore, it is possible to achieve exposure control and white balance control under conditions optimal to each occasion even if the brightness of the neighborhood or the lighting condition varies during operations for continuously capturing images.

Additionally, in the third preferred embodiment, like the second preferred embodiment, plural frames of captured image data including the first frame of captured image data may be periodically stored as raw data. For example, the first and second frames of captured image data are stored as raw data, and the third and fourth frames of captured image data are processed by using the parameters calculated from the first frame of captured image data. Subsequently, the fifth and sixth frames of captured image data are stored as raw data, and the seventh and eighth frames of captured image data are processed by using the parameters calculated from the fifth frame of captured image data. In this manner, a relatively long time can be taken to precisely calculate the parameters in the third preferred embodiment, like the second preferred embodiment.

Fourth Preferred Embodiment

Next, the fourth preferred embodiment will be discussed. According to the third preferred embodiment, the parameters used for exposure control and white balance control are periodically updated. In contrast thereto, according to the fourth preferred embodiment, the parameters which are to be applied to subsequent frames of captured image data are determined through estimation based on plural parameters which have already been calculated.

Figure 13:
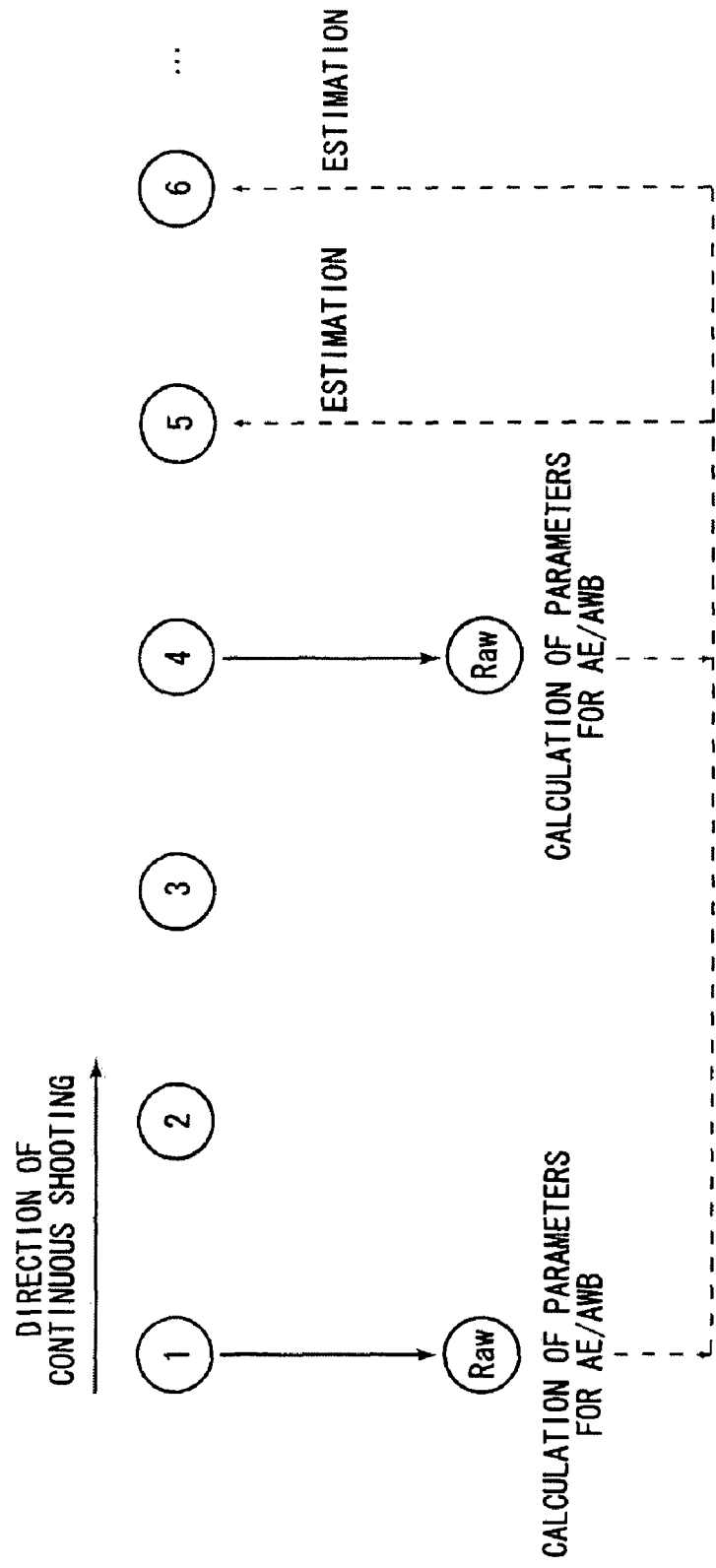
FIG. 13 conceptually illustrates operations for continuously capturing images according to the fourth preferred embodiment.

Referring to FIG. 13, one in every three frames of captured image data is stored as raw data, and the digital gain value 91 for exposure control, the gamma transformation characteristic value 93, and the white balance control calculation value 92 are calculated from the stored frame of captured image data. Then, for the fifth frame of captured image data, necessary parameters are estimated based on the parameters calculated from the first frame of captured image data and the parameters calculated from the fourth frame of captured image data. For example, variation in the circumstances is predicted based on an amount of change in parameters from the first frame to the fourth frame, and parameters used for processes of the fifth and sixth frames of captured image data are estimated on the assumption that the parameters continue to change by the same amount. As a result of the foregoing processes, it is possible to perform exposure control and white balance control which are suited to the circumstances which are constantly changing along with the progress of operations for continuously capturing images.

Additionally, the same method as in the second preferred embodiment may be applied also to the fourth preferred embodiment. More specifically, plural frames of captured image data may be periodically stored as raw data in the main memory 20, so that the parameters can be more precisely calculated by the CPU 18.

Fifth Preferred Embodiment

Next, the fifth preferred embodiment of the present invention will be discussed. According to the first preferred embodiment, the first frame of captured image data is stored as raw data, and the parameters calculated from the stored raw data are used for performing exposure control and white balance control in real time on all subsequent frames of captured image data. In contrast thereto, according to the fifth preferred embodiment, exposure control and white balance control of each of frames of captured image data are achieved by using the digital gain value 91 for exposure control, the gamma transformation characteristic value 93, and the white balance control calculation value 92 which are calculated based on the immediately preceding frame of captured image data during continuous image capture. More specifically, the second frame is processed by the parameters calculated from the first frame, the third frame is processed by the parameters calculated from the second frame, the fourth frame is processed by the parameters calculated from the third frame, and each of the subsequent frames is processed in the same manner.

Note that it has been described that an exposure control evaluation value and a white balance control evaluation value may be obtained either in the SPU 14 or by a software operation in the CPU 18 in the above-described preferred embodiments. However, in the fifth preferred embodiment, the foregoing evaluation values for each of the second and subsequent frames of captured image data need to be obtained in the course of real-time processing without storing the data in the main memory 20. As such, in the fifth preferred embodiment, an exposure control evaluation value and a white balance control evaluation value for each of the second and subsequent frames of captured image data are obtained only in the SPU 14.

Figure 14:
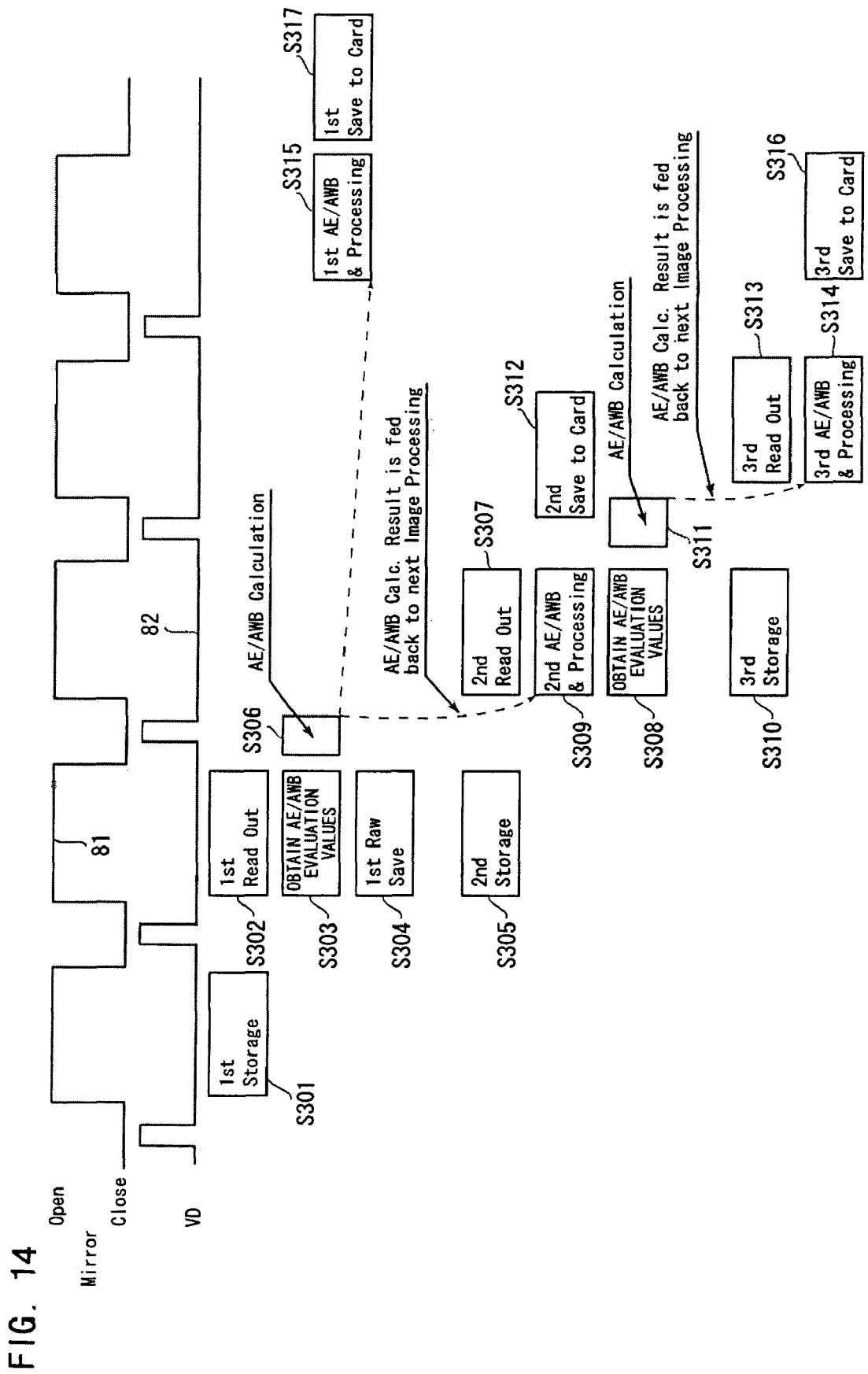
FIG. 14 illustrates a process sequence of operations for continuously capturing images according to the fifth preferred embodiment.

FIG. 14 illustrates a process sequence according to the fifth preferred embodiment. First, with the first timing, the first frame of an image of a subject is stored in the CCD 12 (step S301). With the second timing, the first frame of captured image data is read out from the CCD 12 (step S302), and an exposure control evaluation value and a white balance control evaluation value are obtained in the SPU 14 (step S303). Then, the first frame of captured image data is stored as raw data in the main memory 20 (step S 304). Also, the second frame of an image of the subject is stored in the CCD 12 (step S305) with the second timing.

Subsequently, the CPU 18 calculates the digital gain value 91 for exposure control, the gamma transformation characteristic value 93, and the white balance control calculation value 92 based on the evaluation values obtained from the first frame of captured image data (step S306). Then, the CPU 18 sets the calculated parameters in the register in the RPU 15.

With the third timing, the second frame of captured image data is read out from the CCD 12 (step S307), and an exposure control evaluation value and a white balance control evaluation value are obtained in the SPU 14 (step S308). Also, exposure control, white balance control, and other necessary processes are performed in real time on the second frame of captured image data in the RPU 15 (step S309). At that time, the exposure control and the white balance control of the second frame of captured image are achieved by using the parameters calculated form the first frame. Then, the second frame of captured image data is stored as JPEG data in the main memory 20. Also, the third frame of an image of the subject is stored in the CCD 12 (step S 310) with the third timing.

Subsequently, the CPU 18 calculates the digital gain value 91 for exposure control, the gamma transformation characteristic value 93, and the white balance control calculation value 92 based on the evaluation values obtained from the second frame (step S311). Then, the CPU 18 sets the calculated parameters in the register in the RPU 15.

With the fourth timing, the JPEG data corresponding to the second frame of captured image data is stored in the memory card 22 (step S312). Also, the third frame of captured image data is read out from the CCD 12 (step S313), and exposure control, white balance control, and other necessary processes are performed in real time on the third frame of captured image data in the RPU 15 (step S314) with the fourth timing. At that time, the exposure control and the white balance control of the third frame of captured image data are achieved by using the parameters calculated from the second frame. Then, the third frame of captured image data is stored as JPEG data in the main memory 20. When the third frame of image data is captured, a user moves his fingers off the shutter button, so that no more operating instructions for continuously capturing images can be given With the fifth timing, the raw data corresponding to the first frame of captured mage data is read by the RPU 15, and is subjected to exposure control and white balance control (step S315). At that time, the exposure control and the white balance control of the first frame of captured image data are achieved based on the parameters which are calculated from the first frame of captured image data and are again set in the register in the RPU 15. Then, the first frame of captured image data is stored as JPEG data in the main memory 20. Also, the JPEG data corresponding to the third frame of captured image data is stored in the memory card 22 (step S316) with the fifth timing.

Lastly, the JPEG data corresponding to the first frame of captured image data which is stored in the main memory 20 is sent to be stored in the memory card 22 (step S317).

As is made clear from the foregoing discussion, according to the fifth preferred embodiment, exposure control and white balance control of each of frames of captured image data are achieved by using the parameters calculated from the immediately preceding frame of captured image data. This makes it possible to perform optimal exposure control and optimal white balance control even if the circumstances change during continuous image capture.

Additionally, though an exposure control evaluation value and a white balance control evaluation value for the first frame of captured image data, like evaluation values for the other frames of captured image data, are obtained in the SPU 14 according to the process sequence illustrated in FIG. 14, only the evaluation values for the first frame of captured image data may be obtained by a software operation in the CPU 18 after the raw data corresponding to the first frame of captured image data is stored in the main memory 20. In a case where such procedure is adopted, more precise evaluation values can be obtained as compared to a case in which evaluation values are obtained in the SPU 14 which is a hardware.

Then, in the case where more precise evaluation values for the first frame of captured image data are obtained in the CPU 18, the digital gain value 91 for exposure control, the gamma transformation characteristic value 93, and the white balance control calculation value 92 can be calculated based on the more precise evaluation values, so that more reliable results can be provided. As such, exposure control and white balance control of each of the third and subsequent frames of captured image data may be achieved by using either the parameters calculated from the immediately preceding frame of captured image data or the parameters calculated from the first frame of captured image data, whichever are determined to be more optimal by comparison therebetween.

For example, if the parameters calculated from the first frame and the parameters calculated from the third frame are greatly different from each other, it is likely that the circumstances have significantly changed. In such a situation, exposure control and white balance control of the fourth frame of captured image data are performed by mainly using the latest parameters, i.e., the parameters calculated from the third frame. On the other hand, if two sets of parameters respectively calculated from the first frame and the third frame are not greatly different from each other, a method of averaging the two sets of parameters may be applied.

Additionally, the same method as in the second preferred embodiment may be applied also to the fifth preferred embodiment. More specifically, a long time may be taken to calculate the parameters from the first frame of captured image data with plural frames of captured image data including the first frame being stored as raw data in the main memory 20.

Sixth Preferred Embodiment

Next, the sixth preferred embodiment of the present invention will be discussed. The sixth preferred embodiment will deal with a method of continuously capturing images which is developed from the fifth preferred embodiment. According to the sixth preferred embodiment, when continuity of scenes is lost, raw data is stored in the main memory and the parameters used for exposure control and white balance control are updated.

For example, even in a case where the single lens reflex digital camera 1 is not set to a continuous shooting mode by operations performed on the operating part 24, if the shutter button is continuously pressed, a problem is prevented from being caused by performing the same operations as described in the above fifth preferred embodiment. Specifically, exposure control and white balance control of each of frames of captured image data can be achieved by using the parameters calculated from the immediately preceding frame of captured image data. However, consider a situation in which though a user is intermittently pressing the shutter button, one of intervals at which the shutter button is pressed happens to be relatively longer in a series of pressing operations performed by the user. For example, consider a situation in which the shutter button is not pressed for a predetermined period of time such as 0.5 second. In this situation, it is not appropriate to perform exposure control and white balance control by using the parameters which have previously been calculated. Thus, if the shutter button is not pressed for a predetermined period of time, the camera system is again placed into an initial state. Then, when the shutter button is next pressed, a resulting frame of captured image data is handled in the same manner as the first frame of captured image data. That is, the resulting frame of captured image data is stored as raw data, and the parameters for exposure control and white balance control are re-calculated from the stored raw data.

Also, when the angle of view changes during operations in a zoom mode, it can be determined that continuity of scenes is lost. For example, consider a situation in which a user changes a zoom magnification during continuous image capture. In this situation, if an image capture range greatly changes, it is not appropriate to perform exposure control and white balance control by using the parameters which have previously been calculated. Thus, when a zoom magnification changes to exceed a predetermined threshold value, raw data is again stored and the parameters for exposure control and white balance control are re-calculated from the stored raw data.

Further, when the level of average luminance of images (frames) which are successively captured during operations for continuously capturing images changes to exceed a predetermined threshold value, it can be also determined that continuity of scenes is lost. For example, consider a situation in which a user changes a direction in which the camera is oriented to capture an image, following a subject, during continuous image capture. In this situation, if the subject is moving from a relatively bright place to a relatively dark place, for example, it is not appropriate to perform exposure control and white balance control by using the parameters which have previously been calculated. Thus, when the level of average luminance changes to exceed a predetermined threshold value, raw data is again stored and the parameters for exposure control and white balance control are re-calculated from the stored raw data.

Applications

In each of the above-described preferred embodiments, an order in which pieces of JPEG data obtained by continuous image capture are stored in the memory card 22 is different from an order in which images are captured. Specifically, although a frame of image data which is temporarily stored as raw data in the main memory 20 is captured at an earlier time, the frame of captured image data stored in the main memory 20 is completely processed to be converted into JPEG data and stored in the main memory 20 at the end of operations for continuously capturing images.

In a typical digital camera, captured images are provided with respective file names including sequential numbers in accordance with an order in which the images are captured. In this regard, in each of the above-described preferred embodiments, if a file name is given to each of captured images at a time when JPEG data corresponding to each image is generated or at a time when the image is stored in the memory card 22, a file name of the first frame of captured image data includes a sequential number higher than sequential numbers included in file names of the second and subsequent frames of captured image data. In view of this, in the preferred embodiments of the present invention, a file name including a sequential number is given to each of frames of captured image data not at a time when JPEG data corresponding to each frame of captured image data is generated or at a time when each frame of captured image data is stored in the memory card 22, but at a time when each frame of captured image data is output from the CCD 12. This allows a user to grasp an order in which images are captured at once by looking at file names.

Likewise, with respect to time stamping on JPEG data stored in the memory card 22, if time stamping is performed based on a time when JPEG data is stored in the memory card 22, a frame of image data which is captured first and is temporarily stored as raw data carries a time stamp of a later time. In view of this, in the preferred embodiments of the present invention, time stamping is performed at a time when each of frames of image data is captured (at a time when each of frames of captured image data is output from the CCD 12, for example). This makes it possible to match an order in which frames of image data are continuously captured actually with times included in time stamps which are respectively carried on the frames of captured image data.

According to the above-described preferred embodiments, an exposure control evaluation value and a white balance control evaluation value are obtained by using captured image data output from the CCD 12. In a method alternative thereto, an auxiliary sensor for obtaining shooting conditions is additionally provided, an exposure control evaluation value and a white balance control evaluation value are obtained based on image data provided from the auxiliary sensor, and the digital gain value 91 for exposure control, the gamma transformation characteristic value 93, and the white balance control calculation value 92 are calculated based on the evaluation values thus obtained. For example, by placing the auxiliary sensor in a position where the auxiliary sensor is able to receive light reflected by the pentagonal prism 41, it is possible to obtain an image even before the mirror is flipped up. In this case, the parameters for exposure control and white balance control are obtained before operations for continuously capturing images start.

However, as the auxiliary sensor, only a limited-function sensor can be employed in light of costs and the configuration of the whole apparatus. As such, the parameters based on an image provided from the auxiliary sensor are used as provisional parameters for limited purposes. More specifically, exposure control and white balance control are performed based on the provisional parameters, and further, the same processes as performed in the above-described preferred embodiments are performed, so that more optimal exposure control and more optimal white balance control can be achieved. In particular, with respect to exposure control, since parameters can be obtained before continuous image capture, it is possible to advantageously adjust an analog gain also for the first frame of captured image data.

Additionally, in each of the above-described preferred embodiments, captured image data which is processed in real time in the RPU 15 is finally stored as JPEG data in the main memory 20. However, such a manner of processing is merely one example, and captured image data may be converted into data in other general-purpose image formats to be stored in the main memory 20. For example, un-compressed image data having values of R, G, and B may be output from the RPU 15, so that the image in the un-compressed format is stored as final image data in the main memory 20. Alternatively, un-compressed image data having values of Y, U, and V may be stored as final image data in the main memory 20. Also in those cases in which image formats other than JPEG format are employed, the same advantages as described above can be produced by performing the above-described processes in the preferred embodiments. When finally-generated data is either un-compressed data having values of R, G, and B, or un-compressed data having values of Y, U, and V, it is sufficient that the processes from input of the sensor to pixel interpolation are achieved by the technique of pipeline processing. Further, raw data on which white balance control is performed may be stored as final data.

While the invention has been shown and described in detail, the foregoing description is in all aspects illustrative and not restrictive. It is therefore understood that numerous modifications and variations can be devised without departing from the scope of the invention.

What is claimed is:

1. A method of continuously capturing images of a subject in a single lens reflex digital camera, comprising the steps of:
   (a) capturing leading image data including one frame of image or plural frames of images, and storing said leading image data in a main memory;
   (b) calculating an exposure adjustment value or a white balance adjustment value based on said leading image data;
   (c) capturing subsequent frames of image data; and
   (d) performing exposure control or white balance control in real time on said image data captured in said step (c) based on said exposure adjustment value or said white balance adjustment value which is calculated in said step (b), before storing said image data captured in said step (c) in said main memory, wherein
   said steps (c) and (d) are repeatedly performed, to achieve exposure control or white balance control in real time on said subsequent frames of image data successively, and
   exposure control or white balance control are performed on said leading image data stored in said main memory in said step (a) based on said exposure adjustment value or said white balance adjustment value which is calculated in said step (b), after all operations for continuously capturing images are finished.

2. The method of continuously capturing images in a single lens reflex digital camera according to claim 1, wherein
   an image processor of said single lens reflex digital camera is able to carry out pipeline processing with no intermediate data being stored in said main memory until final data is generated from captured image data input from a sensor, and
   said image data captured in said step (c) is processed in real time without being stored in said main memory until said image data captured in said step (c) is converted into final data, in said step (d).

3. The method of continuously capturing images in a single lens reflex digital camera according to claim 2, wherein
   image processing of said leading image data is achieved by performing at least exposure control or white balance control after said all operations for continuously capturing images are finished.

4. The method of continuously capturing images in a single lens reflex digital camera according to claim 2, wherein
   said leading image data stored in said main memory in said step (a) is raw data on which white balance control is not performed.

5. The method of continuously capturing images in a single lens reflex digital camera according to claim 2, wherein
   said final data is raw data on which white balance control is performed.

6. The method of continuously capturing images in a single lens reflex digital camera according to claim 2, wherein
   said final data is data in a general-purpose image format, on which at least pixel interpolation is performed.

7. The method of continuously capturing images in a single lens reflex digital camera according to claim 6, wherein
   said general-purpose image format is JPEG format.

8. The method of continuously capturing images in a single lens reflex digital camera according to claim 6, wherein
   said general-purpose image format is an uncompressed format with R-, G-, and B-values.

9. The method of continuously capturing images in a single lens reflex digital camera according to claim 6, wherein
   said general-purpose image format is an uncompressed format with Y-, U-, and V-values.

10. The method of continuously capturing images in a single lens reflex digital camera according to claim 2, wherein
    said pipeline processing includes processes from input of image data output from said sensor to pixel interpolation.

11. The method of continuously capturing images in a single lens reflex digital camera according to claim 2, wherein
    said pipeline processing includes processes from input of image data output from said sensor to pixel interpolation and image compression.

12. The method of continuously capturing images in a single lens reflex digital camera according to claim 11, wherein
    said image compression is JPEG compression, and
    two strips of YUV buffers are provided between a processing block for performing said pixel interpolation and a processing block for performing said JPEG compression.

13. A method of continuously capturing images of a subject in a single lens reflex digital camera, comprising the steps of:
    (a) capturing leading image data including one frame of image or plural frames of images, and storing said leading image data in a main memory;
    (b) calculating an exposure adjustment value or a white balance adjustment value based on said leading image data;
    (c) capturing subsequent frames of image data; and
    (d) performing exposure control or white balance control in real time on said image data captured in said step (c) based on said exposure adjustment value or said white balance adjustment value which is calculated in said step (b), before storing said image data captured in said step (c) in said main memory, wherein
    said steps (c) and (d) are repeatedly performed, to achieve exposure control or white balance control in real time on said subsequent frames of image data successively,
    after a predetermined number of frames of images are captured, said steps (a) and (b) are again performed and said steps (c) and (d) are repeatedly performed based on an updated exposure adjustment value or an updated white balance adjustment value, and
    exposure control or white balance control is performed on each of said one frame of image or plural frames of images stored in said main memory in said step (a) based on an exposure adjustment value or a white balance adjustment value which is calculated from each of said one frame of image or plural frames of images stored in said main memory in said step (a), after all operations for continuously capturing images are finished.

14. The method of continuously capturing images in a single lens reflex digital camera according to claim 13, wherein
    said steps (a) and (b) are periodically performed during said operations for continuously capturing images, and said steps (c) and (d) are performed on said subsequent frames of image data based on said updated exposure adjustment value or said updated white balance adjustment value, and
    exposure control or white balance control is finally performed on pieces of image data which are periodically captured in said step (a) based on exposure adjustment values or white balance adjustments value which are respectively calculated from said pieces of image data which are periodically captured in said step (a).

15. A method of continuously capturing images of a subject in a single lens reflex digital camera, comprising the steps of:
(a) capturing leading image data including one frame of image or plural frames of images, and storing said leading image data in a main memory;
(b) calculating an exposure adjustment value or a white balance adjustment value based on said leading image data;
(c) capturing subsequent frames of image data; and
(d) performing exposure control or white balance control in real time on said image data captured in said step (c) based on said exposure adjustment value or said white balance adjustment value which is calculated in said step (b), before storing said image data captured in said step (c) in said main memory, wherein
said steps (c) and (d) are repeatedly performed, to achieve exposure control or white balance control in real time on said subsequent frames of image data successively,
after a predetermined number of frames of images are captured, said steps (a) and (b) are again performed and an exposure adjustment value or a white balance adjustment value for said subsequent frames of image data which are to be captured after said steps (a) and (b) is estimated by using said exposure adjustment value or said white balance adjustment value which is not updated and an updated exposure adjustment value or an updated white balance adjustment value, to perform exposure control or white balance control, and
exposure control or white balance control is performed on each of said one frame of image or plural frames of images stored in said main memory in said step (a) based on an exposure adjustment value or a white balance adjustment value which is calculated from each of said one frame of image or plural frames of images stored in said main memory in said step (a), after all operations for continuously capturing images are finished.

16. The method of continuously capturing images in a single lens reflex digital camera according to claim 15, wherein
said steps (a) and (b) are periodically performed during said operations for continuously capturing images, and said exposure adjustment value or said white balance adjustment value for said subsequent frames of image data which are to be captured after said steps (a) and (b) is estimated from plural exposure adjustment values and plural white balance adjustment values which are obtained during said operations for continuously capturing images, to perform exposure control or white balance control, and
exposure control or white balance control is finally performed on pieces of image data which are periodically captured in said step (a) based on exposure adjustment values or white balance adjustments value which are respectively calculated from said pieces of image data which are periodically captured in said step (a).

17. A method of continuously capturing images in a single lens reflex digital camera, said single lens reflex digital camera including an image processor which is able to carry out pipeline processing with no intermediate data being stored in said main memory until final data is generated from captured image data input from a sensor, said method comprising the steps of:
(a) capturing leading image data including one frame of image or plural frames of images, and storing said leading image data in a main memory;
(b) calculating an exposure adjustment value or a white balance adjustment value based on said leading image data;
(c) capturing subsequent frames of image data; and
(d) calculating an exposure adjustment value or a white balance adjustment value from an exposure control evaluation value or a white balance control evaluation value which is obtained in said step (c), and performing exposure control or white balance control in real time on each of said subsequent frames of image data captured in said step (c) based on an exposure adjustment value or a white balance adjustment value which is calculated from an immediately preceding one out of said subsequent frames of image data continuously captured in said step (c), before storing each of said subsequent frames of image data captured in said step (c) in said main memory, wherein
said steps (c) and (d) are repeatedly performed, to perform exposure control or white balance control on said subsequent frames of image data successively in pipeline processing, and
exposure control or white balance control is performed on said leading image data stored in said main memory in said step (a) based on said exposure adjustment value or said white balance adjustment value which is calculated in said step (b) after all operations for continuously capturing images are finished.

18. The method of continuously capturing images in a single lens reflex digital camera according to claim 17, wherein
image processing of said leading image data is achieved by performing at least exposure control or white balance control after said all operations for continuously capturing images are finished.

19. The method of continuously capturing images in a single lens reflex digital camera according to claim 17, wherein
said leading image data stored in said main memory in said step (a) is raw data on which white balance control is not performed.

20. The method of continuously capturing images in a single lens reflex digital camera according to claim 17, wherein
said final data is raw data on which white balance control is performed.

21. The method of continuously capturing images in a single lens reflex digital camera according to claim 17, wherein
said final data is data in a general-purpose image format, on which at least pixel interpolation is performed.

22. The method of continuously capturing images in a single lens reflex digital camera according to claim 21, wherein
said general-purpose image format is JPEG format.

23. The method of continuously capturing images in a single lens reflex digital camera according to claim 21, wherein
said general-purpose image format is an uncompressed format with R-, G-, and B-values.

24. The method of continuously capturing images in a single lens reflex digital camera according to claim 21, wherein
said general-purpose image format is an uncompressed format with Y-, U-, and V-values.

25. The method of continuously capturing images in a single lens reflex digital camera according to claim 17, wherein said pipeline processing includes processes from input of image data output from said sensor to pixel interpolation.

26. The method of continuously capturing images in a single lens reflex digital camera according to claim 17, wherein
said pipeline processing includes processes from input of image data output from said sensor to pixel interpolation and image compression.

27. The method of continuously capturing images in a single lens reflex digital camera according to claim 26, wherein
said image compression is JPEG compression, and
two strips of YUV buffers are provided between a processing block for performing said pixel interpolation and a processing block for performing said JPEG compression.

28. A method of continuously capturing images of a subject in a single lens reflex digital camera, said single lens reflex digital camera including an image processor which is able to carry out pipeline processing with no intermediate data being stored in a main memory until final data is generated from captured image data input from a sensor, said method comprising the steps of:
(a) capturing leading image data including one frame of image or plural frames of images, and storing said leading image data in said main memory;
(b) calculating an exposure adjustment value or a white balance adjustment value based on said leading image data;
(c) capturing subsequent frames of image data; and
(d) calculating an exposure adjustment value or a white balance adjustment value from an exposure control evaluation value or a white balance control evaluation value which is obtained in said step (c), and performing exposure control or white balance control in real time on each of said subsequent frames of image data captured in said step (c) based on an exposure adjustment value or a white balance adjustment value which is calculated from an immediately preceding one out of said subsequent frames of image data continuously captured in said step (c), before storing each of said subsequent frames of image data captured in said step (c) in said main memory, wherein
said steps (c) and (d) are repeatedly performed, to perform exposure control or white balance control on said subsequent frames of image data successively in pipeline processing, and
when continuity of scenes is lost during operations for continuously capturing images, said steps (a) and (b) are again performed and thereafter said steps (c) and (d) are repeatedly performed.

29. The method of continuously capturing images in a single lens reflex digital camera according to claim 28, wherein
when a shutter button is placed in an off state for more than a predetermined period of time during said operations for continuously capturing images, it is determined that continuity of scenes is lost.

30. The method of continuously capturing images in a single lens reflex digital camera according to claim 28, wherein
when a zoom magnification is changed to exceed a predetermined threshold value during said operations for continuously capturing images, it is determined that continuity of scenes is lost.

31. The method of continuously capturing images in a single lens reflex digital camera according to claim 28, wherein
when a level of average luminance of successive images captured is changed to exceed a predetermined threshold value during said operations for continuously capturing images, it is determined that continuity of scenes is lost.

32. The method of continuously capturing images in a single lens reflex digital camera according to any of claims 1, 13, 15, 17, and 28, wherein
file names of pieces of image data which are finally generated as a result of said operations for continuously capturing images are given in accordance with an order in which said pieces of image data are captured.

33. The method of continuously capturing images in a single lens reflex digital camera according to any of claims 1, 13, 15, 17, and 28, wherein
time stamping is performed on pieces of image data which are finally generated as a result of said operations for continuously capturing images, not at a time when said image data is finally stored in a storage medium, but at a time when said image data is captured.

34. The method of continuously capturing images in a single lens reflex digital camera according to any of claims 1, 13, 15, 17, and 28, wherein
another exposure adjustment value or another white balance adjustment value is calculated based on image data captured in a sensor for obtaining shooting conditions before said operations for continuously capturing images start, and
further exposure control or further white balance control is performed based on said exposure control adjustment value or said white balance control adjustment value which is calculated during said operations for continuously capturing images.

* * * * *